United States Patent
Adarraga

(10) Patent No.: US 10,545,642 B2
(45) Date of Patent: Jan. 28, 2020

(54) METHOD TO KNOW THE REACTION OF A GROUP RESPECT TO A SET OF ELEMENTS AND VARIOUS APPLICATIONS OF THIS MODEL

(71) Applicant: Juan Moran Adarraga, Madrid (ES)

(72) Inventor: Juan Moran Adarraga, Madrid (ES)

(73) Assignee: APPGREE SA, Parla, Madrid (ES)

( * ) Notice: Subject to any disclaimer, the term of this patent is extended or adjusted under 35 U.S.C. 154(b) by 393 days.

(21) Appl. No.: 13/646,600

(22) Filed: Oct. 5, 2012

(65) Prior Publication Data
US 2013/0097245 A1   Apr. 18, 2013

Related U.S. Application Data

(60) Provisional application No. 61/544,749, filed on Oct. 7, 2011, provisional application No. 61/591,112, filed on Jan. 26, 2012.

(51) Int. Cl.
*G06F 3/0484* (2013.01)
*G06F 3/048* (2013.01)
(Continued)

(52) U.S. Cl.
CPC .......... *G06F 3/04842* (2013.01); *G06F 3/048* (2013.01); *G06F 3/0482* (2013.01);
(Continued)

(58) Field of Classification Search
CPC ... H04L 41/042; H04L 41/046; H04L 41/145; H04L 41/5003; H04L 41/5009;
(Continued)

(56) References Cited

U.S. PATENT DOCUMENTS 5,995,951 A   11/1999   Ferguson
6,321,086 B1  11/2001   Thurston et al.
(Continued)

FOREIGN PATENT DOCUMENTS

WO   WO 00/41081 A1   7/2000
WO   WO 03/083615 A2  10/2003
(Continued)

OTHER PUBLICATIONS

U.S. Appl. No. 13/646,564, filed Oct. 5, 2012, Adarraga.
U.S. Appl. No. 14/877,551, filed Oct. 7, 2015, Adarraga.

*Primary Examiner* — Barbara B Anyan
(74) *Attorney, Agent, or Firm* — Sughrue Mion, PLLC

(57) ABSTRACT

The present invention provides systems and methods that provide knowledge about a reaction (e.g. interest) of a group (normally of people) with respect to a set of elements, wherein each group member can react in a different manner. Assuming that the group is accessible by electronic means (e.g. Internet) this system may be based on a group response algorithm to estimate group reaction minimizing workload of group members and minimizing the time needed.
To minimize or reduce group members' workload and time, the algorithm uses statistic tools. The group response system estimates group reaction with previously set statistic reliability.
The present invention can use too in some cases, secondary algorithms for specific cases.

17 Claims, 28 Drawing Sheets

Communication main steps

US 10,545,642 B2
Page 2

(51) Int. Cl.
*G06Q 10/10* (2012.01)
*G06Q 50/00* (2012.01)
*G06Q 30/02* (2012.01)
*G06Q 10/06* (2012.01)
*H04L 29/06* (2006.01)
*H04L 29/08* (2006.01)
*G06F 3/0482* (2013.01)
*H04M 1/725* (2006.01)

(52) U.S. Cl.
CPC ......... *G06F 3/0484* (2013.01); *G06Q 10/067* (2013.01); *G06Q 10/10* (2013.01); *G06Q 30/02* (2013.01); *G06Q 30/0201* (2013.01); *G06Q 30/0203* (2013.01); *G06Q 50/01* (2013.01); *H04L 63/0421* (2013.01); *H04L 65/403* (2013.01); *H04L 67/10* (2013.01); *H04L 67/22* (2013.01); *H04M 1/72522* (2013.01)

(58) Field of Classification Search
CPC ..... H04L 41/16; H04L 43/16; H04L 67/1008; H04L 67/101
See application file for complete search history.

(56) References Cited

U.S. PATENT DOCUMENTS

| | | | |
|---|---|---|---|
| 6,556,974 B1* | 4/2003 | D'Alessandro | G06Q 10/0639 705/7.32 |
| 6,581,071 B1* | 6/2003 | Gustman | G06Q 30/02 707/601 |
| 6,980,983 B2 | 12/2005 | Banerjee et al. | |
| 7,092,821 B2 | 8/2006 | Mizrahi et al. | |
| 7,330,841 B2 | 2/2008 | Cochran et al. | |
| 7,377,431 B2 | 5/2008 | Urken | |
| 7,630,944 B2 | 12/2009 | Rupp et al. | |
| 8,073,792 B2 | 12/2011 | Hughes | |
| 8,195,522 B1* | 6/2012 | Sonne | G06Q 30/02 705/26.2 |
| 8,935,198 B1* | 1/2015 | Phillips et al. | 706/62 |
| 9,009,082 B1* | 4/2015 | Marshall | G06Q 30/0601 705/26.1 |
| 2002/0016731 A1* | 2/2002 | Kupersmit | G06Q 30/02 705/7.32 |
| 2002/0138333 A1* | 9/2002 | DeCotiis | G06Q 10/067 705/7.32 |
| 2003/0018487 A1* | 1/2003 | Young et al. | 705/1 |
| 2003/0078900 A1 | 4/2003 | Dool | |
| 2003/0227479 A1 | 12/2003 | Mizrahi et al. | |
| 2004/0171381 A1* | 9/2004 | Inselberg | H04H 20/38 455/426.2 |
| 2005/0192931 A1* | 9/2005 | Rogers | G06F 17/3089 |
| 2005/0261953 A1* | 11/2005 | Malek et al. | 705/10 |
| 2006/0155513 A1 | 7/2006 | Mizrahi et al. | |
| 2007/0011185 A1* | 1/2007 | John | G06Q 30/02 |
| 2007/0186230 A1 | 8/2007 | Foroutan | |
| 2007/0226296 A1 | 9/2007 | Lowrance et al. | |
| 2008/0028313 A1* | 1/2008 | Ebert | G06O 30/02 715/730 |
| 2008/0097830 A1 | 4/2008 | Kim | |
| 2008/0119134 A1 | 5/2008 | Rao | |
| 2008/0214162 A1 | 9/2008 | Ramer et al. | |
| 2009/0024457 A1 | 1/2009 | Foroutan | |
| 2009/0112782 A1 | 4/2009 | Cross et al. | |
| 2009/0138315 A1* | 5/2009 | Schroeder | 705/8 |
| 2009/0157483 A1* | 6/2009 | Otto | G06N 5/025 706/45 |
| 2009/0164240 A1* | 6/2009 | Friedmann | G06Q 50/22 705/2 |
| 2009/0192878 A1* | 7/2009 | Lefang | G06Q 10/00 705/7.32 |
| 2009/0306967 A1* | 12/2009 | Nicolov | G06Q 30/02 704/9 |
| 2010/0023469 A1 | 1/2010 | Farnham | |
| 2010/0088156 A1* | 4/2010 | Wilson | G06Q 30/0203 705/7.32 |
| 2010/0153142 A1 | 6/2010 | Vasudevan et al. | |
| 2010/0153156 A1* | 6/2010 | Guinta et al. | 705/8 |
| 2010/0257117 A1* | 10/2010 | Shvadron | G06F 17/30616 705/36 R |
| 2010/0262462 A1 | 10/2010 | Tryfon | |
| 2010/0306043 A1* | 12/2010 | Lindsay | G06Q 30/02 705/14.41 |
| 2011/0145570 A1* | 6/2011 | Gressel | H04L 63/0421 713/159 |
| 2011/0231779 A1 | 9/2011 | Vaidya et al. | |
| 2012/0072261 A1* | 3/2012 | Oberoi | G06Q 30/02 705/7.32 |
| 2012/0084149 A1 | 4/2012 | Gaudiano et al. | |
| 2012/0124065 A1 | 5/2012 | Butterfield et al. | |
| 2012/0282582 A1 | 11/2012 | Rao | |
| 2012/0284324 A1 | 11/2012 | Jarville et al. | |
| 2013/0035989 A1* | 2/2013 | Brown | G06Q 30/0201 705/7.33 |
| 2013/0097202 A1 | 4/2013 | Jurca | |
| 2013/0173793 A1* | 7/2013 | Voien | H04L 67/22 709/224 |

FOREIGN PATENT DOCUMENTS

| | | |
|---|---|---|
| WO | WO 03/083615 A3 | 4/2004 |
| WO | WO 2009/067328 A2 | 5/2009 |
| WO | WO 2009/154808 A1 | 12/2009 |
| WO | WO 2009/067328 A3 | 9/2010 |
| WO | WO 2010/105115 A2 | 9/2010 |
| WO | WO 2010/105115 A3 | 1/2011 |

\* cited by examiner

Communication main steps

A new type of crowd sourcing

Democratic Collective Intelligence

METHOD TO KNOW THE REACTION OF A GROUP RESPECT TO A SET OF ELEMENTS AND VARIOUS APPLICATIONS OF THIS MODEL

CROSS-REFERENCE

This application claims the benefit of U.S. Provisional Application No. 61/544,749, filed Oct. 7, 2011, U.S. Provisional Application No. 61/591,112, filed Jan. 26, 2012, and Spanish Application No. P201230645, filed Apr. 30, 2012, which applications are incorporated herein by reference in their entirety.

BACKGROUND OF THE INVENTION

Today life standards cannot be imagined without communication systems for individuals and groups, e.g., Internet, TV. Those communication systems have been evolving from old standards and currently, there is a full array of interactive tools allowing people to communicate in different ways. With current standards, one person can broadcast a message to a practically unlimited number of persons.

However, there is no way such unlimited number of persons can send a message to the person who has broadcasted the message to them. Such techniques for communication do not exist using a back channel. Social networks, email, sms, video, and any other current communication tools, are powerful tools for communications one to one and one to many but, when a big group of people looks for a way to express its will, there is no tool that can help this group.

FIG. 31 shows a picture of a large group of people. This large group is expressing something as a group. A need exists to determine what the group is expressing.

A need exists for a Global Social Communication System. A further need exists for a turning point in the development of social communication media.

SUMMARY OF THE INVENTION

Systems and methods described herein are at this turning point to help in fueling this jump.

As previously mentioned, a need exists for systems and methods of group expression. A need exits for a back channel that can be made through a software system that allows communities no matter how numerous to send messages, express opinions, take actions that is, in may ways acting as a single person. That way, a community may be able to communicate with a person or with other communities, the same way a person can communicate with another person.

To a better understanding of the basic principle that permits to build a new breed of applications to complete this Global Social Communication System an example is shown in FIGS. 33 to 35. Note that it is very simple, and in its simplicity lies its power:

FIG. 32 represents a large community with a shared interest. FIG. 33 describes the emergence of multiple proposals from different members of this community. With current standards there is no way of knowing "in a minute" what the proposal is that most satisfies the interest of the whole community. FIG. 34 shows one example of the systems and methods described herein. Through computer assisted methods, the system may randomly (stratification may be used too) form groups of people that evaluate different proposals each and vote the proposals they prefer. FIG. 35 shows the selection of the proposals that are the most voted by the groups, that is, a set of proposals that contains with high probability the most interesting proposal for the community. If the result contains too many proposals, and we want to have a more precise result, it is possible to run the same system twice or more until we get few or one proposal. In the second run, a smaller set of proposals will be submitted for evaluation, thus, we need fewer evaluation groups with a higher number of members. That will make the evaluation more representative. In subsequent runs the resultant proposals set is getting smaller until it contains the few or one proposal desired.

Group reaction evaluation systems and methods as provided in accordance with aspects of the invention may permit the building of a new breed of applications that offer services never known until now, which may be of crucial impact on a Global Social Communication System.

FIG. 1 provides an illustration of a global social communication system provided in accordance with embodiments of the invention.

Steps one to four represent current communication infrastructure: email and the Internet, providing a basic infrastructure. The Web, and information proliferation formed the second step. Another communication step may include PageRank, such as those provided in search engines, such as Google, which provide information availability. Social networks permit individual level relationships.

Step five: group reaction evaluation systems such as those provided herein, provide democratic collective intelligence.

A few examples of the services given by those applications are provided herein. For example, group reaction evaluation systems may allow individuals and organizations to estimate in real time (or in asynchronous mode) with minimal impact on the individuals the position of groups (no matter how big they are) respect to any subject that is potentially of their interest. This may be useful for any type of organizations or individuals, including but not limited to: companies interested in knowing clients opinion on their existing products or future ones; governments interested in knowing the opinion of citizens; TV shows or other media content interested in knowing the opinion of the audience about what is being broadcasted; TV Shows, debates, sports events permitting the audience to actively participate, and/or political parties interested in knowing the opinion of their voters.

Systems and methods described herein may also advantageously allow groups (no matter how big they are) to express its opinions respect to any subject potentially of their interest. Examples of such groups may include but are not limited to common interest communities, voters, brand consumers, sport teams or persons fan's communities, and/or media or other content viewers.

Systems and methods described herein refer to both the special algorithm that permits to estimate in a fraction of minute the position (reaction) of a group respect to (when exposed to) any subject potentially of its interest (set of elements) and some possible applications that by using such algorithm can give solutions that have never been possible until now and wouldn't be possible unless they use the algorithm which is the other object of this application.

Aspects of the invention are directed to a computer aided method for estimating the reaction of an agent set comprising a plurality of agents that are presented with an opportunity to provide an agent reaction to one or more options, said method comprising: providing a first option set comprising a plurality of options; dividing, with aid of a computer processor, the agent set into a first plurality of agent subsets, wherein the agents belonging to one or more individual agent subset of the agent set are randomly selected; dividing the option set into a plurality of option subsets that comprehends the first option set; assigning one or more different option subsets to each respective agent subset; providing all the options in every assigned option subset to each agent within the respective agent subset; receiving an agent reaction to all the options in every assigned option subset from each agent within the respective agent subset; and inferring, with aid of a computer processor, a statistical estimation of the reaction of the agent set to each and every option in the first option set, based on a selected analysis of the agent reactions in the respective agent subsets to the assigned option subsets.

In some embodiments, the ratio of the total number of options in the first option set to the number of options in the assigned option subsets provided to an individual respective agent subset is greater than or equal to 2:1. Information about the selected analysis to be conducted using the agent reactions may be made available for sharing with the agents before giving the agents the opportunity to provide a reaction. A parallel evaluation may occur between the agent subsets of the agent set, wherein the evaluation includes evaluation of all the options in every assigned option subset provided to the respective agent subset. In some embodiments, the statistical estimation includes a confidence interval.

In accordance with some embodiments, the options may be proposals, and the statistical estimation may include an acceptance rate of the proposals by the agents. The proposals can be presented by two or more communities, and the statistical estimation includes the acceptance rate of said proposals by the two or more communities. The two or more communities may be opposing interests communities and the methods can be used as part of a negotiation technique, wherein a short list of proposals comprising one or more proposals is generated based on said acceptance rates. The method may further comprise utilizing the statistical estimation to create a subsequent option set, with aid of a processor, comprising one or more options from the first option set that are selected for the subsequent option set if the acceptance rate exceeds a predetermined threshold. In some embodiments, the method may further comprise utilizing the statistical estimation to create a subsequent option set, with aid of a processor, comprising one or more options from the first option set, that comprises the most preferred option according to the agent set, at a predetermined confidence level. The method may also further comprise utilizing the statistical estimation to create a subsequent option set, with aid of a processor, comprising one or more options from the first option set, that contains a selected number of most preferred options according to the agent set, at or exceeding a predetermined confidence level. The one or more options may be one or more queries to be presented, wherein a limited number of queries may be presented and said subsequent option set includes the limited number of queries. The method may further comprise: determining a conclusion based on the reaction of the agent set if a predetermined objective is attained.

In some embodiments, a method provided in accordance with an aspect of the invention may further comprising, if the predetermined objective is not attained: (a) utilizing the statistical estimation to create a subsequent option set, with aid of a processor, comprising one or more options from the first option set; (b) dividing, with aid of a processor, the agent set into a plurality of subsequent agent subsets, wherein the agents belonging to one or more individual subsequent agent subset of the agent set are randomly selected; (c) dividing the subsequent option set into a plurality of subsequent option subsets that constitute the subsequent option set; (d) assigning one or more different subsequent option subsets to each respective subsequent agent subset; (e) providing all the options in every assigned subsequent option subset to each agent within the respective subsequent agent subset; (f) receiving an agent reaction to all the options in every assigned subsequent option subset from each agent within the respective subsequent agent subset; and (g) determining a conclusion based on the reaction of the agent set if the predetermined objective is attained, or repeating steps (a)-(g) if the predetermined objective size is not attained.

In some embodiments, the conclusion may include a limited number of options and the objective may be attained if this limited number of options contains a selected number of most preferred options according to the agent set, at a predetermined confidence level. The one or more options can be one or more queries to be presented, wherein a limited number of queries may be presented and said conclusion includes the limited number of queries and said predetermined objective is attained if the limited number of queries contains a selected number of most preferred queries according to the agent set, at a predetermined confidence level. The conclusion may include a subsequent option set that is selected based on target acceptance and/or size of the subsequent option set.

In some embodiments, the number of the first plurality of agent subsets is determined based on the number of options in the first option set. The ratio may be greater than or equal to 10:1, 100:1, 1,000:1, or 10,000:1. In some embodiments, each option subset includes only 1, 2, 3, 4, or 5 options. The agent reaction may be received via a user interface of a mobile device.

An aspect of the invention may be directed to a method for formulating potential responses to a query comprising: presenting the query to a plurality of agents in a response sample group, wherein the response sample group is a subset of an agent set; receiving a plurality of potential responses to the query from the plurality of agents within the response sample group; creating a first option set comprising a plurality of options, wherein the plurality of options are the plurality of potential responses; and performing a method in accordance with an aspect of the invention, as described elsewhere herein.

A method for formulating a query may be provided in accordance with another aspect of the invention. The method may comprise: receiving, from a user, a proposal for a query to be presented to an agent set; presenting the query to a plurality of agents within a query sample group, wherein the query sample group is a subset of the agent set; receiving agent reactions to the query from the plurality of agents within the first sample group; and determining, with aid of a processor, if the query exceeds a predetermined threshold based on the agent reactions, and if the agent reaction exceeds a predetermined threshold performing a method provided in accordance with an aspect of the invention, such as those described earlier herein.

In accordance with some embodiments of the invention, information about the selected analysis to be conducted using the agent reactions is made available for sharing with the agents before receiving the agent reaction. A parallel evaluation may occur between the agent subsets of the agent set, wherein the evaluation may include evaluation of all the options in every assigned option subset provided to the respective agent subset. The method may further comprise utilizing the statistical estimation to create a subsequent set of potential responses, with aid of a processor, comprising one or more potential responses from the first option set. In some embodiments, the number of the first plurality of agent subsets may be determined based on the number of potential responses in the first option set.

In some embodiments, the query may be presented via the display of a mobile device. The plurality of potential responses may be received via said mobile device.

In accordance with some embodiments, the response sample group and the query sample group may include one or more of the same agents. The response sample group and the query sample group may include one or more different agents. If any duplications in potential responses exist, they may be removed from the plurality of potential responses. If any duplications in potential responses exist provided by different agents, the agents that provided the potential responses may get credit for having provided the potential responses.

Additional aspects of the invention are directed to a method of determining opinions on a total set of options in a community comprising a plurality of agents, the method comprising: defining a number of groups based on a number of options in the total set of options or an expected number of options; assigning each agent of said plurality to one of the groups; for each group, presenting to each agent within the group for evaluation a number of options fewer than the number of options in the total set of options; for each group, receiving from each agent an evaluation of each option presented to the agent; and determining, with aid of a processor, a best option or set of options according to community opinion using the evaluations received from each of the agents in each of the groups.

In some embodiments, the agents are assigned to their respective groups using a statistical sampling method. The number of options presented to each group may be the same. In some instances, the number of options presented to each group is determined by equally dividing the number of options in the total set of options by the number of groups. The number of options presented to each group may be one. A number of the agents assigned to each group may be determined by equally dividing the number of the plurality of agents by the number of options in the total set of options. For each group, the options presented to each agent of the group may be different from the options presented to agents in remaining groups.

In some embodiments, the methods provided in accordance with aspects of the invention may, further comprise: (a) determining a set of best option candidates using the evaluations received from each agent in each group; (b) for each group, presenting to each agent within the group for evaluation at least one option from the set of best option candidates; and (c) for each group, receiving from each agent an evaluation of the at least one option from the set of best option candidates presented to the agent.

The method as provided herein may further comprise: repeating, a predefined number of times or until a desired statistical confidence level is achieved, the steps of (a)-(c), wherein the agents are assigned to their respective groups using a statistical sampling method, and for each repetition, a number of options in the set of best option candidates is further reduced.

Determining the best option or set of options may comprise selecting an option or set of options that received a most favorable evaluation among the total set of options based on the evaluation from each of the agents in each of the groups. The step of (a) determining the set of best option candidates may comprise selecting n options having n most favorable evaluations among the total set of options, where n>1 and n is less than the number of options in the total set of options. The total set of options may comprise submissions received from at least one of the plurality of agents. Aggregate information regarding the evaluations may be made available to the plurality of agents.

Aspects of the invention may also be directed to a non-transitory computer readable medium storing a program causing a computer to execute a process for determining opinions on a total set of options in a community comprising a plurality of agents, the process comprising: defining a number of groups based on a number of options in the total set of options or an expected number of options; assigning each agent of said plurality to one of the groups; for each group, presenting to each agent within the group for evaluation a number of options fewer than the number of options in the total set of options; for each group, receiving from each agent an evaluation of each option presented to the agent; and determining a best option or set of options according to community opinion using the evaluations received from each of the agents in each of the groups.

Additional aspects of the invention may include a computer system that determines opinions on a total set of options in a community comprising a plurality of agents, the computer system comprising: a programmable processor configured to: define a number of groups based on a number of options in the total set of options or an expected number of options; assign each agent of said plurality to one of the groups; for each group, present to each agent within the group for evaluation a number of options fewer than the number of options in the total set of options; for each group, receive from each agent an evaluation of each option presented to the agent; and determine a best option or set of options according to community opinion using the evaluations received from each of the agents in each of the groups; and a display device configured to display the best option or set of options.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE FIGURES

The novel features of the invention are set forth with particularity in the below. A better understanding of the features and advantages of the present invention will be obtained by reference to the following detailed description that sets forth illustrative embodiments, in which the principles of the invention are utilized, and the accompanying drawings of which:

FIG. 15 shows an access screen of the application.

FIG. 16 shows a first screen a user sees after accessing a chat.

FIG. 17 shows a Favorites screen.

FIG. 18 shows a notification screen.

FIG. 19 shows a screen in which the user can see a question from the Leader.

FIG. 20 shows a screen in which the user can see a proposal of answer from the Leader.

FIG. 21 shows the winner answer, the percentage of votes achieved by it and some more information.

FIG. 22 shows a new and different communication from the Leader.

FIG. 23 shows a screen in which a picture is proposed to the user to be voted.

FIG. 24 shows a screen showing the winner picture, the percentage of votes achieved by it, and some other information for the user.

FIG. 25 shows a screen with a new communication from the Leader saying thanks to her fans.

FIG. 26 shows a screen with a new communication from the Leader.

FIG. 27 shows a screen with the percentage of votes obtained by the winner picture from the men community and some other information.

FIG. 28 shows a screen with a ranking of the best-voted pictures and the fans that proposed them, the number of votes and percentage.

FIG. 29 shows a three-band chat.

FIG. 30 shows the continuation of the three-band chat.

FIG. 31 provides an illustration of a big group of people expressing something.

FIG. 32 shows a large community with a shared interest.

FIG. 33 shows the emergence of multiple proposals from different members of the community.

FIG. 34 shows groups of people that evaluate different proposals.

FIG. 35 shows the selection of proposals that are the most voted by the groups.

DETAILED DESCRIPTION OF THE INVENTION

Figure 1:
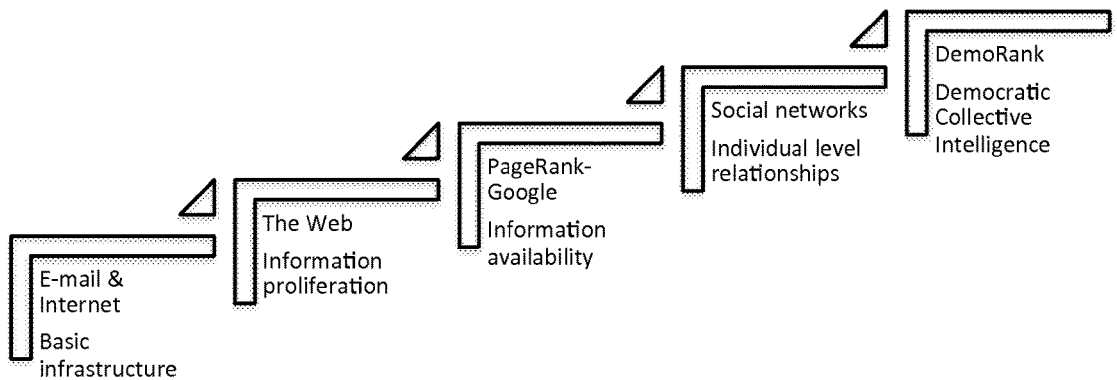
FIG. 1 provides examples of communication steps that may be involved in a global social communications system.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for estimating a group reaction in accordance with aspects of the invention. Various aspects of the invention described herein may be applied to any of the particular applications set forth below or for any other types of group decision analysis or voting process. The invention may be applied as a stand-alone system or method, or as part of a decision-making process. It shall be understood that different aspects of the invention can be appreciated individually, collectively, or in combination with each other.

In some embodiments, one or more terms may be provided as described below. Such terms may be provided by way of example only and are not limiting.

Agent: An "agent" may include hereto who or what (e.g., person, computer . . . any other entity or device) is supposed to react when exposed to an element. Example: User Group: A "group" may include hereto a set or subset of agents. Zero, one, two or more agents may be provided within a group. In some embodiments, a group may be an agent set, which may include zero, one, two or more agents. An agent subset may be a subset of the agent set, which may include one or more agents of the agent set. Example: User group Element: An "element" may include hereto what (e.g., content, question, query, proposal, design, option . . . any other) is supposed to trigger an agent reaction when exposed to it. Any description of an element herein may apply to and/or encompass any of the other examples of what may trigger an agent reaction (e.g., content, question, query, proposal, design, or option), and vice versa. Example: proposal to the group.

Element Set: An "element set" may include hereto the set of all the elements. Any description of an element set may apply to and/or encompass a set of any other examples of what may trigger an agent reaction (e.g., content set, question set, query set, proposal set, design set, or option set), and vice versa. Example: All the proposals to the group Exposition: An "exposition" may include hereto the presentation of an element to an agent. Example: User reading a proposal.

Agent Reaction: An "agent reaction" may include the result of an exposition of the element to the agent. Example: User votes yes to a proposal.

Reaction Set: A "reaction set" may include the set of all the reactions that an Agent can have respect to an element. Example: {yes, no, no answer}.

Group Reaction: A "group reaction" may include the total reactions of each type that would have taken place in the whole group if we have had exposed a given element to all the group members. Example: {yes=500, no=400, no answer=100}

Group Reaction Rate: A "group reaction rate" may include the total reactions of each type that would have taken place in the whole group if a given element had been exposed to all the group members divided by the sum of the reactions of all the types and multiplied by 100 e.g. is the group reaction in percentage format. Example: {yes=50%, no=40%, no answer=10%}

Group Reaction Set: A "group reaction set" may include the group reactions for all the elements in the element set.

Target Reaction: In some cases, a "target reaction" may be characterized as the "preferable reaction" or the "positive reaction". Example: "yes" is the target reaction.

Target Reaction Rate: A "target reaction rate" may be the group reaction rate for the target reaction. Example {yes=50%}

Best element: A "best element" may be the element from the element set that has the higher target reaction rate. Example: the element that would have had the maximum "yes" votes if voted by the whole group.

Best N elements: A "best N elements" may be the set of the N elements that have the higher group reaction rate for the target reaction. Example: the set of five elements that would have had the maximum "yes" votes if voted by the whole group.

Best Short list: A "best short list" may be a subset of the element set that, with a certain confidence level contains the best element. Example, a list of 10 proposals out of 1000 that contains at the 99% confidence level the one that would have had most "yes" votes by all the members of the group.

N Best Short list: An "N best short list" may be a subset of the element set that, with a certain confidence level contains the best N elements. Example, a list of 13 proposals out of 1000 that contains at the 99% confidence level the five proposals that would have had most "yes" votes by all the members of the group.

Figure 14:
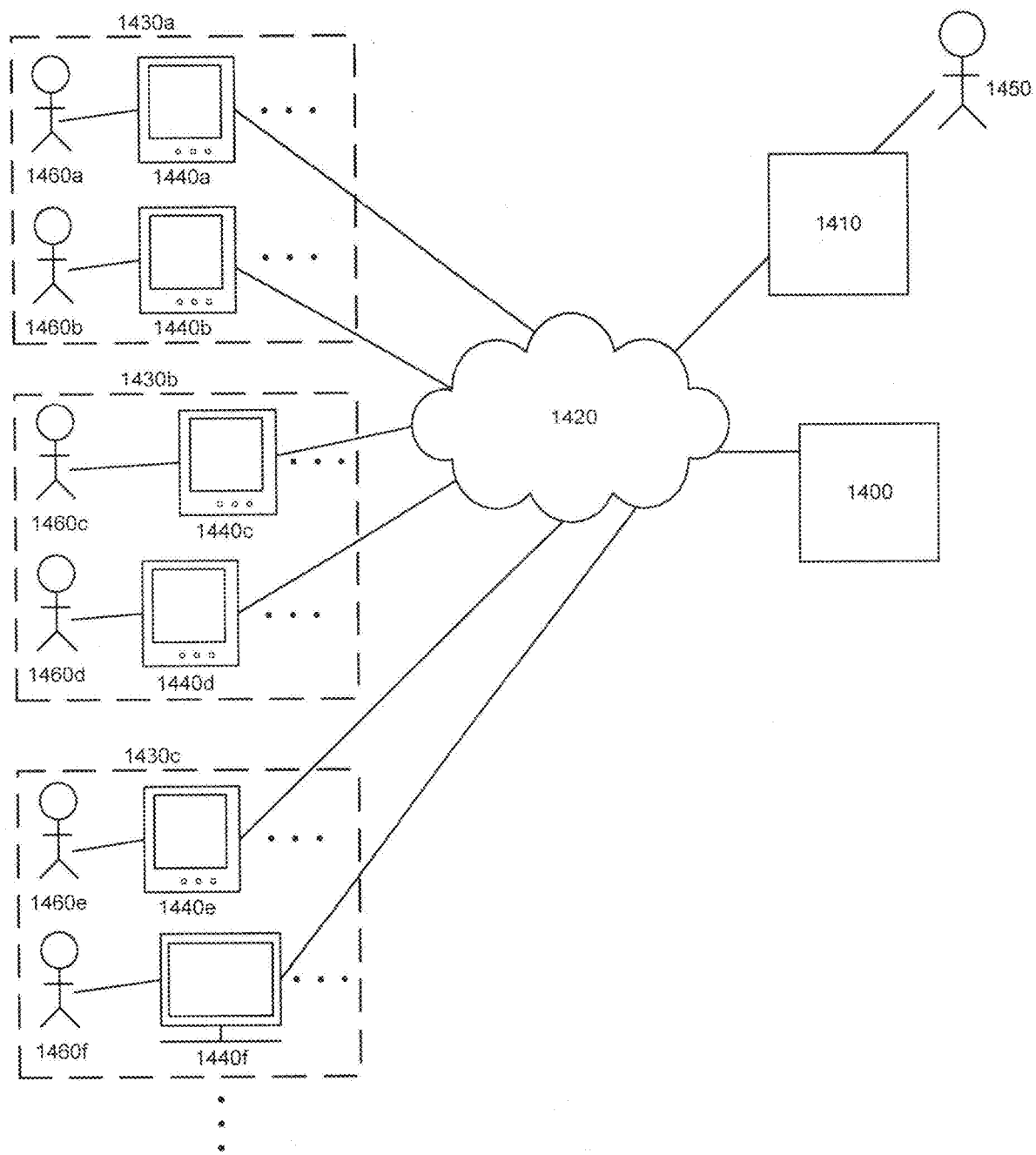
FIG. 14 provides an illustration of a group reaction evaluation system provided according to embodiments of the system.

FIG. 14 provides an illustration of a group reaction evaluation system provided according to embodiments of the system. Any description herein of group reaction evaluation system may relate to any form of group evaluation or group response, group-decision making, or action-evaluation, or vice versa. For example a group reaction may be provided for evaluative and/or decision-making purposes. Any description herein of a group reaction evaluation system may apply to a group response system, group decision-making system, or action-evaluation system, and vice versa.

The system may include a plurality of users 1450, 1460*a*, 1460*b*, 1460*c*, 1460*d*, 1460*e*, 1460*f*. A user may be an agent when he or she is part of a randomly chosen sample of agents. Agents may communicate via one or more devices 1440*a*, 1440*b*, 1440*c*, 1440*d*, 1440*e*, 1440*f* which may be divided into one or more groups 1430*a*, 1430*b*, 1430*c*. Preferably, agents may be individuals/persons. Agents may be individuals interacting with the system through devices. In alternative embodiments, agents may be devices or may utilize devices. The agents may communicate over a network 1420 with one or more server 1400 and/or one or more console 1410. The server(s) and/or console(s) may be separate devices or may be integrated into a single device. In some instances a user 1450 of the system may interact with the system over a network 1420.

An agent may be a user/person 1460*a*. The agent may use a device too 1440*a*. In alternative embodiments an agent may be a device. Normally this user 1460*a* uses a device 1440*a* to connect to Internet. The device may display and/or be exposed to an element. Examples of devices may include but are not limited to a personal computer, server computer, laptop, tablet, satellite phone, smartphone (e.g., iPhone, Android, Blackberry, Palm, Symbian, Windows), cellular phone, personal digital assistant, Bluetooth device, pager, land-line phone, or any other network device. In some embodiments, the device may be a mobile device. A mobile device may be easily transportable (e.g., tablet, smartphone). In some instances, the mobile device may be a handheld device. The device may be capable of communicating with a network. In some instances, the device may be capable of communicating with the network wirelessly and/or over a wired connection. The device may have a programmable processor and/or a memory. The memory may be capable of storing tangible computer readable media which may comprise code, instructions, and/or logics for one or more steps described herein. The programmable processor may be capable of performing one or more steps described herein in accordance with the tangible computer readable media.

The network 1420 may be a local area network (LAN) or wide area network (WAN) such as the Internet. The network may be a personal area network, a telecommunications network such as a telephone network, cell phone network, mobile network, a wireless network, a data-providing network, or any other type of network. The communications may utilize wireless technology, such as Bluetooth or RTM technology. Alternatively, various communication methods may be utilized, such as a dial-up wired connection with a modem, a direct link such as TI, ISDN, or cable line. In some embodiments, a wireless connection may be using exemplary wireless networks such as cellular, satellite, or pager networks, GPRS, or a local data transport system such as Ethernet or token ring over a LAN. In some embodiments, the system may communicate wirelessly using infrared communication components.

An agent 1440*a* may be in most of the cases a user, but it also may be a device having a memory and a processor. An agent may be in most of cases a user/person, but it may be a device having a memory and a processor. The memory may be capable of storing non-transitory computer readable media, which may include logic, instructions, or code for performing one or more step. The processor may be capable of performing one or more step, such as a step provided by the computer readable media. The device may also have a display. The display may show a user interface. A user 1460 of the system may interact with the device through a user interface. The user may be an agent user. A user may interact via a user interactive device which may include but is not limited to a keypad, touchscreen, keyboard, mouse, trackball, touchpad, joystick, microphone, camera, motion sensor, IR sensor, heat sensor, electrical sensor, or any other user interactive device.

In some embodiments, a device may be an agent. Alternatively, a user that is exposed to an element via a device may be an agent. In some instances, the user and the device exposing the user to an element may collectively be an agent. In one example, a device may display content, such as a question, to the user. The user may respond to the question through the device. The content may be visual or audio content. Visual or audio content may be static and/or dynamic. The user may interact with the content via the device. In one example, the device may display or provide audio asking the user to select between two choices (e.g., A or B). The user may select a choice (e.g., A or B) through a user interactive device of the device. The user may be able select an option from a plurality of options through the device. Alternatively, the user may be capable of providing a free form answer to a query through the device.

In some embodiments, a plurality of agents may be provided in a system. The agents may jointly provide a group reaction evaluation system. Any number of agents may be provided. For example, two or more, 10 or more, 100 or more, 1,000 or more, 10,000 or more, 50,000 or more, 100,000 or more, 500,000 or more, 1,000,000 or more, 5,000,000 or more, 10,000,000 or more, 50,000,000 or more, 100,000,000 or more, or 1,000,000,000 or more agents may be provided. In some embodiments, a preselected group of agents may be provided. For examples, agents may be screened for desirable traits or characteristics. Alternatively, the agents may be provided from a population at random.

The plurality of agents may form an agent set. The agent set may include a population that is connected to the system. The agent set may include a population that is connected to the system at a certain time or within a certain time period. In some instances, the agent set may maximize or utilize a large sample size. The agent set may include a population that is given an opportunity to provide a reaction to one or more options. In some instances, the agent set may be the desired population from which to receive a response; no further weighting or extrapolation may be needed to determine a group reaction. The agent set may represent the universe of agents that may be interacting with the system in response to a query or one or more options. The agent set may represent the universe of agents exposed to a query or one or more options.

The agents may be divided into groups 1430*a*, 1430*b*, 1430*c*. Any number of groups may be provided. One or more, two or more, three or more, five or more, ten or more, 20 or more, 50 or more, 100 or more, 500 or more, 1,000 or more, 5,000 or more, 10,000 or more, 50,000 or more, 100,000 or more, 500,000 or more, or 1,000,000 or more groups may be provided. The groups may have substantially the same size. Alternatively, the groups may have different sizes. In some instances, the groups may be sized so that there is a difference of no more than one, no more than five, no more than ten, or no more than 100 between the sizes of the largest and smallest groups. Agents in the groups may be selected using any sampling method like for example simple random sampling (SRS) or stratified sampling. The agents in the group may be selected using any sampling method like for example simple random sampling (SRS) or stratified sampling with aid of a processor that may utilize one or more random selection or generation algorithm. In some alternative embodiments, the groups may be selected in accordance with one or more criteria, such as location, demographics of users, use history of devices, self-selection, or any other criteria. The devices within the groups may be the same or may vary. For example, the system may provide elements to users carrying mobile devices 1440*a* or at a computer 1440*f*. Users within groups may be exposed to content via any type of device, such as those described herein.

One, two or more servers 1400 may be provided in accordance with an embodiment of the invention. A server may include a memory and/or a processor. The memory may store elements and/or responses to elements. The server may or may not be at a location that is remote to the devices. The server may communicate with the devices over a network. In some instances, a cloud computing infrastructure may be provided. Any functions described herein may be carried out using a cloud computing infrastructure, such as distributed processing and memory functions. In alternate embodiments, peer to peer architectures may be utilized by the system.

One, two or more consoles 1410 may be provided. A console may communicate with the servers and/or devices over a network. A console may be a device of any type described elsewhere herein. A console may be a device having a memory and a processor. The memory may be capable of storing non-transitory computer readable media, which may include logic, instructions, or code for performing one or more step. The processor may be capable of performing one or more step, such as a step provided by the computer readable media. The console may also have a display. The display may show a user interface. A user 1450 of the system may interact with the console through a user interface. The user may be an administrative user. A user may interact via a user interactive device which may include but is not limited to a keypad, touchscreen, keyboard, mouse, trackball, touchpad, joystick, microphone, camera, motion sensor, IR sensor, heat sensor, electrical sensor, or any other user interactive device.

The devices may be used to display contents and/or queries to user agents of the devices. The users may respond to the queries, in order to provide collective group decision, opinion, or action-making. The queries may be determined by an administrative user through a console, or by the server. In some instances, a pool of content and/or queries for group evaluation may be provided to the system. For example, a plurality of television shows may be evaluated.

The user agents and their respective devices may be divided into groups. In some embodiments, each member of a given group may be exposed to the same content, and members of different groups may be exposed to different content. For example, a first group may be exposed to a first television show, while a second group may be exposed to a second television show. Each member of the first group may be exposed to the same first content, while each member of the second group may be exposed to the same second content. The members of each group may be given an opportunity to respond to a query regarding the content. For example, the members of a group may each vote (e.g., thumbs up, thumbs down) to the television show, or may rank or rate the television show (e.g., on a scale of 1 to 5), or respond to any other query relating to the television show to which they were exposed. In some instances, the response may be binary, selected from a plurality of options, or free-form; that is, the users may have full freedom to respond anything they want, not restricted by any type of options.

The content may be provided to the user agents through their respective devices or through a separate display. For example, a user agent's mobile device may show content, such as a television show directly to the user agent. Alternatively, the various user agents may attend a show prescreening that is displayed on a separate device. The queries may be presented to the user agents through their respective devices (e.g., mobile devices) or through a separate device (e.g., screen that showed a television show). The user agents' responses may be received by their respective devices. The responses may be sent through the devices to one or more server. The server may make, using a processor, one or more calculation relating to the responses. The server may determine subsequent steps.

In some instances, an administrative user may view data relating to the content, queries, and/or responses. The administrative user may set one or more parameters that may determine the content provided, size and/or distribution of groups, queries provided, analysis to be done on the responses, and/or subsequent steps to be taken based on responses. In alternative embodiments, one or more administrative functions may be performed using a processor without requiring human intervention.

Figure 13:
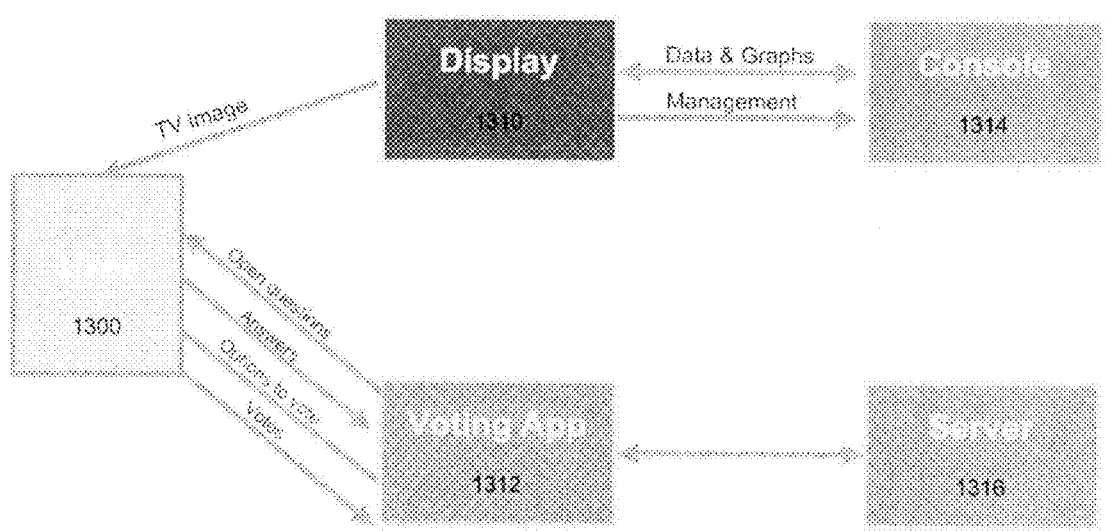
FIG. 13 provides an example of a group reaction evaluation system in accordance with an embodiment of the invention.

FIG. 13 provides an example of a group reaction evaluation system in accordance with an embodiment of the invention. A group response to content may be determined. In one example, television content may be evaluated using the group reaction evaluation system.

A user 1300 may be exposed to content through a display 1310. In one example, a display device provides a television image to the user. For example, if the user is evaluating a television show, the user may view the television show via the display. The content may include visual and/or audio content.

The display 1310 may communicate with a console 1314. In some embodiments, data and/or graphs may be communicated between the display and the console. In some instances, two-way communication of the data and/or graphs may be provided. Management may be provided from the display to the console and/or vice versa. In one example, the console may determine which content is to be shown on the display. A user may be provided who may determine the content to be presented. Alternatively, a software program may determine the content to be presented in an automated fashion, without requiring human interaction. In some instances, the content displayed to a user may be selected based on a group to which the user belongs.

A user 1300 may be in communication with a voting application 1312. Open questions may be presented to the user from the voting application, and the user's answers may be received. In another example, options to vote may be provided to the user and the user's vote may be provided. Any queries presented to the user may be very open (e.g., open ended questions), semi-open (e.g., many options to choose from, such as rankings, multiple choices, ratings), or not open (e.g., choosing between binary options, such as yes or no).

The voting application may be provided on a device with which the user may interact. In some instances, the voting application may be displayed on a browser. The voting application may or may not be a program downloaded to the device. The voting application may or may not be provided in the persistent memory of the device. In some instances, the display that provides content (e.g., the television show) to the user may be part of the same device, or may be a separate device.

The voting application 1312 may be in communication with a server 1316. In some instances, the voting application may be part of the server. The server may provide instructions to the voting application. The server may provide the queries to the voting application. The server may receive the responses from the voting application. In some instances, based on the responses, the server may be used to generate subsequent queries. The server may or may not be in communication with the console 1314.

Systems and methods described herein may be advantageous for group reaction evaluation when there are a large number of queries to ask a group. The example below provides an illustration of a scenario where a large number of queries is provided to a large group. In some examples, any number of queries (e.g., 1 or more, 2 or more, 5 or more, 10 or more, 20 or more, 50 or more, 100 or more, 200 or more, 500 or more, 1,000 or more, 5,000 or more, 10,000 or more, 50,000 or more, or 100,000 or more queries) may be provided to any sized agent set (e.g., 1 or more agents, 5 or more agents, 10 or more, agents, 50 or more agents, 100 or more agents, 500 or more agents, 1,000 or more agents, 5,000 or more agents, 10,000 or more agents, 50,000 or more agents, 100,000 or more agents, 500,000 or more agents, 1,000,000 or more agents, 5,000,000 or more agents, 10,000,000 or more agents, 50,000,000 or more agents, or 100,000,000 or more agents).

Example 1

In one example, there may be 1,000 queries to ask to a group of 100,000 members (that is 1,000 elements to evaluate). In order to obtain a precision (reliability) of 100% one would need to ask 1,000 queries to each member (100,000) of the group—that is 1,000*100,000=100,000,000 queries total, in other words, 1,000 queries for each group member.

By using systems and methods provided herein, we can take 1,000 random samples of 100 members each (this size may depend on the precision required) and assign every different query to all the members of each different sample that is, 100,000 queries total instead of 100,000,000 queries total. In other words, each group member would answer one query instead of 1,000 queries.

We get an estimation of the reaction of the entire group to every query with a determined reliability depending on sample size.

This is an outstanding reduction of the workload on each group member and an outstanding reduction of the time needed to evaluate community position. We simply have to assume a reliability of let's say 98% instead of 100%. For the vast majority of the real cases this is reliable enough.

In the above-mentioned example we have made some concretions for a better understanding. We are implicitly referring to human members in a group. Group reaction evaluation systems and methods described herein can be used with humans or any other entity like computers or other devices.

In one generalization, there may be Q number of queries to ask an agent set of M number of members. Q and M may be any positive integer, such as any of the numbers described elsewhere herein. The agent set may be divided into Q groups, with M/Q members in each group. If M/Q does not yield a whole number, the groups may have the nearest whole number above or below M/Q. For example, if 5 queries are provided, and a total agent set of 24 individuals is provided, the individuals may be divided into 5 groups, four of which have 5 members, and one of which has four members. The members of the groups may be randomly selected (e.g., the agent set may be randomly divided into N groups).

Each member in each group may be exposed to one of the queries. For example, the queries may include $Q_1$, $Q_2$, $Q_3$, ... $Q_Q$. There may be Q groups, of which each member of group 1 is exposed to query $Q_1$, each member of group 2 is exposed to query $Q_2$, ... each member of group Q is exposed to query $Q_Q$. Responses to each respective query may be collected from members of each respective group.

Our interest is to know the reaction of the group respect to the element set, that is, the evaluation of the group of each element.

If we pretend to have 100% reliability there is no option other than to put in contact every Agent with every Object (100,000,000 queries in the above mentioned example).

However, if we decide on getting statistic estimation instead we can have a high reliability with a fraction of the Agent workload and in a fraction of the time.

Systems and methods described herein estimate with pre-set statistic reliability the reaction of all the agents of the group respect to all the elements of the element set with the minimum or a reduced possible exposure.

Group Reaction Evaluation Engine

Figure 2:
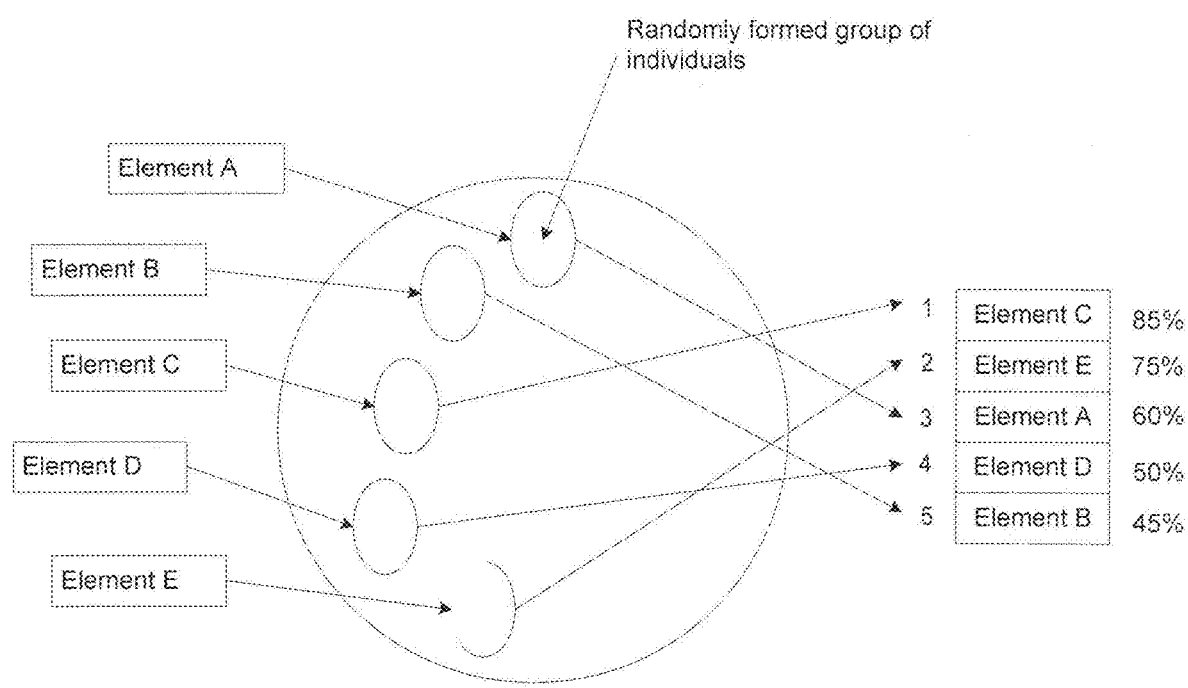
FIG. 2 provides an example of group division, in accordance with an aspect of the invention.

The group reaction evaluation engine may create multiple random samples that are randomly formed groups of individuals from the group population. Each of these groups may be formed by individuals randomly chosen. Then these population subsets may be used as significant samples to evaluate statistically the group reaction respect to an element set. FIG. 2 helps to understand how:

Elements on the left represent the element set. We want to estimate the group (big circle) reaction respect to this element set. Agent samples are randomly chosen (small ovals) among the group. Each element is assigned to a sample to detect sample agent reaction. On the right we can see the element set ordered by the Agent samples reactions. Thus, agents within the big circle may be divided into groups (small ovals) at random. The small ovals may or may not have substantially the same size (e.g., number of agents).

For example, the element set may include five or more elements (e.g., A, B, C, D, E). Randomly formed groups of individuals may be provided. Each group may be exposed to an element (e.g., Group A may be exposed to Element A, Group B may be exposed to Element B, . . . ). In some instances, the same element is not presented to different groups. For example, Element A may be presented to only Group A. Alternatively, overlap may be provided between different groups. In some instances, each group may only be exposed to a single element. For example, Group A may only be presented with Element A. Alternatively, groups may be exposed to more than one element. In some instances, a one to one relationship may be provided between the groups and the elements presented.

Each individual group may react to the element presented. For example, Group A may react to Element A, Group B may react to Element B, Group C may react to Element C, and so forth. This may include collecting a response from each member of the group to the element. For example if Group A has 100 members, each of the 100 members may provide a response to Element A. Alternatively, one or more of the members may provide a response to Element A. In some instances, one or more members need not provide a response. Alternatively, all members in a group provide a response.

In some embodiments, the type of response that may be provided may include responses to open-ended questions, ratings, rankings, multiple choice options, or binary options.

If a target reaction has been set, the elements will be ranked according to its proximity to that target reaction. For example if the options for responses are 'yes' or 'no' and the target reaction is 'yes', then the elements may be ranked according to their proximity to the 'yes' response. For example, as shown in FIG. 2, Element C may have received an 85% 'yes' response, while Element E may be next highest in the rankings with a 75% 'yes' response. Element B may be at the bottom with a 45% 'yes' response. This may mean that 85% of the members of group C voted 'yes' for Element C (e.g., if 1000 members were provided in Group C, 850 members voted 'yes'). Alternatively, this may mean that 85% of those who provided any response voted 'yes' for Element C (e.g., if 1000 members were provided in Group C but only 500 members of the group voted, then 425 of the members voted 'yes').

Proximity to target reaction need not be limited to binary responses. For example, if the response may be ranking from 1 to 10, the target reaction may be a 10. The responses may be ranked on the average ranking value (e.g., if Element C received an average of 8.5 from Group C, and if Element E received an average of 7.5 from Group E, Element C may be ranked higher than Element E).

Elements may be ranked in accordance with their proximity to a target reaction. In some instances, the target reaction may be a positive reaction or favorable reaction. Proximity to a target reaction may indicate a positive or favored element. For example, Element C, having received a higher percentages of 'yes' may be considered to be more favorable over Element B, which received a lower percentage of 'yes.' The proximity to the target reaction may indicate which elements have the qualities indicated by the target reaction. For example, if the target reaction is humorous, the element that has a highest number of agents selecting that element as 'humorous' may be the most humorous.

Each sample can be exposed to one or more elements and each element can be exposed to one or more samples. In one example, each sample may be exposed to only a single element. Alternatively, a sample group may be exposed to a plurality of elements. For instance, the sample group may be presented with a series of several questions. The plurality of elements may be provided serially or simultaneously. In some embodiments, each element is only provided to a single sample group. Alternatively, an element may be provided to multiple sample groups, alone or combined with other elements.

In accordance with an aspect of the invention, a computer aided method for estimating the reaction of an agent set comprising a plurality of agents that are presented with an opportunity to provide an agent reaction to one or more options may be provided. The method may comprise one or more of the following steps: providing a first option set comprising a plurality of options; dividing, with aid of a computer processor, the agent set into a first plurality of agent subsets, wherein the agents belonging to one or more individual agent subset of the agent set are randomly selected; dividing the option set into a plurality of option subsets that comprehends the first option set; assigning one or more different option subsets to each respective agent subset; providing all the options in every assigned option subset to each agent within the respective agent subset; and receiving an agent reaction to all the options in every assigned option subset from each agent within the respective agent subset. One or more agent may belong in an agent subset. One or more options may be provided within an option subset. In some instances, a small number of options may be provided within each option subset. For example, each option subset may have 1 or fewer, 2 or fewer, 3 or fewer, 4 or fewer, 5 or fewer, 6 or fewer, 7 or fewer, 10 or fewer, 15 or fewer, or 20 or fewer options. The options may include any set of content, such as proposals, queries, responses to queries, binary options, or ratings. The options may be provided by one or more agents, communities, or any other source. A parallel evaluation may occur between the agent subsets of the agent set. The evaluation may include evaluation of all the options in every assigned option subset provided to the respective agent subset.

The method may also include inferring, with aid of a computer processor, a statistical estimation of the reaction of the agent set to each and every option in the first option set, based on a selected analysis of the agent reactions in the respective agent subsets to the assigned option subsets. Such statistical estimation may be performed in accordance with any techniques described herein. The statistical estimation may include a confidence interval. The statistical estimation may include an acceptance rate of one or more options, such as proposals, by agents. Based on the statistical estimation, a conclusion may be formed. The conclusion may be determined based on the reaction of the agent set. The conclusion may include a limited number of options, and an objective may be attained if the limited number of options contains a selected number of most preferred options according to the agent set, at a predetermined confidence level. The most preferred options may be those having the highest acceptance rate for a target reaction.

In some embodiments, the ratio of the total number of options in the first option set to the number of options in the assigned option subsets provided to an individual respective agent subset is greater than or equal to 2:1. In other embodiments, the ratio of the total number of options in the first option set to the number of options in the assigned option subsets provided to an individual respective agent subset is greater than or equal to 3:1, 4:1, 5:1, 7:1, 10:1, 50:1, 100:1, 500:1, 1,000:1, 5,000:1, 10,000:1, 100,000:1, or 1,000,000:1. The number of the first plurality of agent subsets may be determined based on the number of options in the first option set. The number of plurality of agent subsets may be determined on the number of option subsets. In some instances, the number of plurality of agent subsets equals the number of option subsets.

Group Reaction Evaluation System Output

In accordance with aspects of the invention, reaction evaluation systems and methods can have multiple applications and different ways of working. Basically, three outputs may be delivered related to a specific reaction or target reaction of the group respect to each element in a set of elements:

1. A Confidence Interval:

The position (reaction) of the group respect to every element may be estimated. The decision, opinion, or action-making (e.g., statistical) systems and methods may give us a maximum value and a minimum value for the group reaction rate. The position of the group reaction rate for each element may be between those minimum value and maximum value at a certain confidence level, this may be the confidence interval.

For example, for the example provided in FIG. 2, Element C target reaction value may be between 78%, and 86% at a 99% confidence level. The confidence interval may be provided for a fixed range of minimum or maximum values, or may vary. The confidence interval may be determined for a selected range of the minimum and maximum values.

To make the confidence interval, for example the Adjusted Wald method (other statistical methods) might be used, that permits to estimate the group reaction rate based on the polls on the random samples.

2. A Short List

A short list is a subset of elements that, with a certain probability (confidence level) contains the one that would get the higher group reaction rate (in fact, a reaction close enough to the target reaction) for the target reaction. We call this the "short list". An example of a short list is a list of 10 proposals that contains at the 99% confidence level the proposal that would have been the most voted by all the members of the group.

To make the short list a beta binomial model (or other statistical methods) might be used. In some cases a beta binomial model based on the polls on the random samples may be used to infer the distribution of the group reaction rates for every element. It is then straightforward to calculate the probability for each element to be more voted than all the others. The list of elements may be ordered from more probable to less probable and the "N" first elements having an aggregated probability higher or equal than the confidence level required may be selected. "N" may refer to any whole number greater than or equal to 1, (e.g., 1, 2, 3, 4, 5, 6, 7, 8, 9, 10, . . . ).

In some embodiments, the number of members in the short list may be fixed and/or selected. For example, it may be desirable to have the top N elements, where N is a selected number. In other embodiments, the short list may comprise members that may pass a certain confidence level or threshold, regardless of the number of members that pass. For example, if a threshold of 80% is provided, the short list may include any number of members that pass the threshold level with a specified level of confidence.

3. Among all the Elements of the Short List, the Probability for Each One of being the Best Voted.

To calculate this probability a beta binomial model (or other statistical methods) might be used.

We can combine those outputs in different ways to different uses of reaction evaluation systems and methods. We use examples to better show how such systems and methods can be used.

In some embodiments and methods described herein, a formal statistical approach may be employed. In other embodiments, systems and methods herein do not necessarily have to use formal statistic methods to estimate the reaction of a group to a set of elements. Heuristic methods can be used as well. An example is provided herein:

In some instances, it may be desired to estimate the "most voted" option among a set of options N1 by a group of agents (e.g. persons). The most voted option may be the option that would have been voted if the entire population of agents were asked to vote. The result of the estimation may be deemed the "winner option"

The systems and methods may accept a certain number of proposals by agents (persons) of the group.

The systems and methods may send subsets of the proposals set to subsets of the agent set or agent group to be voted (pass or not to pass).

The systems and methods may choose the N2 most voted options by the agent subsets. N2 can be decided by any criteria we want to use (minimum % of votes, certain number of options, any calculation based on number of options, number of agents, number of vote repetitions we decide to run, or any other criteria).

The N2 most voted options by the agent subsets may be submitted to a repeated round of voting. This time N2 may be obviously smaller than N1. Thus, agent subsets may be more numerous than in the previous round, meaning that this time the N3 resulting list may have fewer elements.

Any number of voting runs may occur, as needed to obtain the winner option. For example, one, two, three, four, five, six, seven, eight, nine, ten or more rounds may be run.

Based on simulations using different data models with different types of populations, methods described herein may yield the resulting winner option after three runs or less. The winner option may be the most voted option or, may have an acceptance rate less than one percent lower than the most voted option (e.g. if the most voted has an acceptance rate of 83%, the winner option using our method has an acceptance rate of 82% or more).

Simplicity and Transparency

Simplicity and transparency are two advantageous features of the decision, opinion, or action-making systems and methods provided in accordance with embodiments of the invention. A simple algorithm may be utilized that everybody can understand the procedure. Systems and methods described herein may be transparent for users. That means that every user of an application using the decision, opinion, or action-making system may be knowledgeable of the fact that he or she is actually deciding as a part of a community on every single decision of such community. The user may be aware of the algorithms used or types of calculations that are performed. The system may be a transparent system that informs the users of the methodologies that are implemented. The user may or may not be aware of the results of the algorithms and/or calculations. For example, the user may or may not see the results of other users within the user's group or the entire agent set. The user may or may not see responses, element rankings, or any other results.

In some embodiments, information about the selected analysis to be conducted using agent reactions may be made available for sharing with the agents before giving them an opportunity to provide a reaction.

It is important to keep this in mind when reading the examples of different uses of the group reaction evaluation systems and methods because in its simplicity and transparency lies its power. There are some applications of statistical models in different fields (internet, TV, . . . ) but in all the traditional cases they are not transparent for the users. The users are passive subjects of those statistical calculations and have neither decision power nor feeling of ownership on the decisions taken.

The group reaction evaluation system described herein is instead a true tool for masses to participate in every decision that concerns them, being this, features of a new mobile phone or a new car, the programming of their favorite TV Channel or the strategic of their baseball team.

Synchronous and Asynchronous Mode

In many of the examples of uses of the embodiments, we will emphasize its synchronous mode to point out the power of statistical approach to give immediate results and information. However, applications can also be used in an asynchronous mode that is, answers to the questions, participations in surveys or any other can delay in time with no problem at all.

In some embodiments, the group reaction may be obtained within a short amount of time. The group reaction may be obtain in less than 1 day, 12 hours, 6 hours, 3 hours, 2 hours, 1 hour, 30 minutes, 15 minutes, 10 minutes, 5 minutes, 2 minutes, 1 minute, 30 seconds, 10 seconds, 5 seconds, or 1 second of formulating the groups and/or presenting the queries. The members of the group may all be available simultaneously to provide feedback. In some instances, the members of an agent set may all be available for providing responses within a specified time interval, which may be a short window of time. The members of the group may simultaneously be exposed to content and/or queries.

In some other embodiments, the group reaction may be obtained over time. The reaction of individual members of a group may be obtained within a short amount of time. For example, a member reaction may be obtained within 1 hour, 30 minutes, 15 minutes, 10 minutes, 5 minutes, 2 minutes, 1 minute, 30 seconds, 10 seconds, 5 seconds, or 1 second of being placed into a group, or being exposed to content. In some instances, the responses from a plurality of individual members may be gathered over time as individual members are exposed to content at different times, log on at different times, and/or become provided to a group at different times. The members may be exposed to content and/or queries over a stretch of time, and need not be simultaneously exposed.

Additional Multiple Applications for Group Reaction Evaluation Systems: New Type of Crowd Sourcing.

Figure 3:
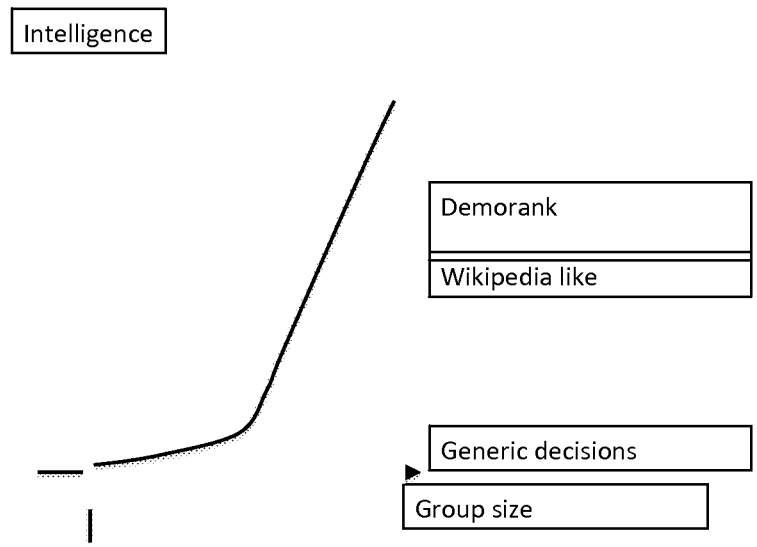
FIG. 3 provides an illustration of a new type of crowd sourcing.
Figure 4:
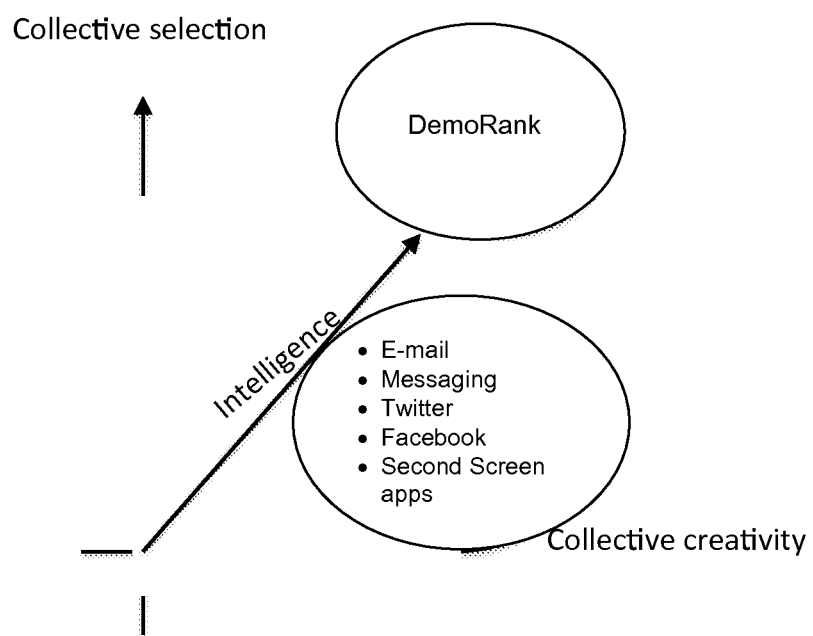
FIG. 4 provides an illustration of democratic collective intelligence as provided in accordance with some embodiments of the invention.

Below, some examples of apps are provided that by using systems and methods described herein can deliver services unknown until now and impossible without said systems and methods. The universe of new apps using a group reaction evaluation system will be a new type of crowd sourcing (e.g., shown in FIG. 3) increasing significantly the collective intelligence (e.g., shown in FIG. 4).

Group Central Management

In group central management mode there is a control center (an individual, a team) that decides the elements that are exposed to the agents that is, the management center wants to estimate the reaction of the group respect to certain elements and runs the group reaction methods accordingly. The management center may include one or more administrative users who may be capable of interacting with a group reaction evaluation system.

An example of this mode is the use of a group reaction evaluation system in applications for TV Shows where the possibility of estimating the audience reaction to some elements can be crucial for the Show success. See example 2.

Example 2

Suppose that we have a population (group) of 1,000,000 people (agents) participating in a TV show. People from the audience can send pictures (elements) to participate in a contest. There is a prize for the most voted picture. The 10,000 first pictures in arriving will be accepted for the contest. Normally to determine the best picture would require a jury, a small group of people to see 10,000 pictures and vote the best. In traditional systems, each member of the jury has to watch 10,000 pictures, remember more or less and decide on the best, which is not very realistic.

Apart from this, it is normally useful for the show's success that the audience participates in the picture's voting but would you ask 1,000,000 people to see 10,000 pictures each? And would you pretend that they see the pictures in a minute to meet the TV Show schedule? How would this be possible?

With the group reaction evaluation system's algorithm the entire audience can be the jury. Systems and methods described herein can determine "in a minute" (e.g., short span of time) the best picture according to audience opinion. This may be done using the "short list" mode of the algorithm.

The magic of statistics:
If we want to find with 100% confidence the most voted picture, that is the picture among the 10,000 more voted by the 1,000,000 people of the audience, we have to make every single person in the audience to see and vote 10,000 pictures.
Using methods provided herein, instead 10,000 random samples may be chosen from among the 1,000,000 people of the audience. The fact that the samples are random (or any other statistically significant sampling method) means that they are statistically representative samples of the whole audience.

One picture may be sent to each of the 10,000 random samples to be voted (like/don't like) by its 100 members The N most voted pictures may be chosen.

The N most voted options may be chosen by the agent subsets. N can be decided by any criteria that is desired for use (minimum % of votes, certain number of options, any calculation based on number of options, number of agents, number of vote repetitions that are decided to run, or any other criteria)

Those N most voted options may be submitted to the agent subsets to a voting again. This time the options to be voted are smaller than the total number of options to be voted in the previous run thus, agent subsets are more numerous than in the previous round, meaning that this time the samples are more statistically representative.

As many voting runs may be performed as needed to obtain the winner option.

According to simulations using different data models with different types of populations, methods provided herein may yield on average the resulting winner option after three runs either is the most voted option or, has an acceptance rate less than one percent lower than the most voted option (e.g. if the most voted has an acceptance rate of 83%, the winner option using our method has an acceptance rate of 82% or more)

Thus, if we accept just a 1% average error, we only need 3 votes per person.

Some assumptions are made: if the audience opinion on the pictures is that all are equally nice, then no contribution is made. But this is a very extreme and rare case. Let's assume for this example purposes a bounded Paretto distribution with a value of 2 for the a parameter for the voting percentages, which is not unusual.

The group reaction evaluation method may include an algorithm that may automatically choose 10,000 random samples of 100 members each and distributes the pictures among them, each one of the pictures to the 100 people of the sample. Each member has to vote 1 picture, in this specific case, just to say I like, I don't like it (in other cases we can ask them to answer in an open mode, not only yes/no).

The division of members into groups may be provided in a random manner. The random groups may be selected with aid of a processor. In some instances, a server processor may create the groups. The number of groups may equal the number of elements. For example, if 10,000 proposals are provided, there may be 10,000 groups, each corresponding to one of the proposals. The number of members within each group may be substantially the same, or may vary, e.g., by one member or less, five members or less, ten members or less, or 100 members or less. For example, the number of members (e.g., 100) of the group may be the total population (e.g., 1,000,000 people) divided by the number of proposals (e.g., 10,000). If the total population divided by the number of proposals does not yield an integer, then some groups may be rounded up or down to provide groups having numbers of members that closely match the result. For example, if 10,000 people are provided in the population, and there are 3 proposals, three groups may be formed, the first group having 3,333 members, the second group having 3,333 members, and the third group having 3,334 members.

The processor may execute an algorithm that may automatically through a special statistical analysis obtain a short list of 70 pictures and guarantees that with a confidence level of 99% the winner picture is in this 70 pictures short list. In some instances, the short list may be selected based on the confidence level (e.g., 80% confidence, 90% confidence, 95% confidence, 99% confidence, 99.5% confidence, 99.9% confidence). The threshold confidence level may be a parameter that may be set by a user or software application. In other instances, the proposals in the short list may be selected based on its order of ranking among the other proposals (e.g., top 10 proposals, top 100 proposals, top 1,000 proposals), or any combination of confidence level and ranking. Additionally the algorithm may inform about the probability of each of the pictures in the short list of being the most voted.

It also provides confidence intervals for the values (votes) of each element in the short list.

Algorithm Second, Third, . . . and "n" Run

It is possible to run the algorithm again. That will result in a shorter list. The algorithm may be run as many times as wanted until there is a list short enough to be voted by the whole audience. In some instances, a statistical estimation from a previous iteration may be used to create a subsequent option set. The subsequent option set may be the short list, which may comprise one or more options from the previous option set that are selected. In some instances, the options may be selected for the short list if an acceptance rate by the agents exceeds a predetermined threshold or a predetermined confidence level. In some instances, a limited number of options may be provided in a short list.

The algorithm may include any of the processes described herein, such as previously described. This may include the division of a general population into a plurality of randomly chosen sample groups, presenting one or more elements to each sample group, and receiving responses from members of each sample group to the elements. For example, the initial list of proposals may provide 10,000 options. After the initial run of the algorithm, a short list of 70 samples may be generated.

In this example, running the algorithm for a second time, we randomly choose 70 sample groups of 14,286 each, and expose one of the 70 pictures of the short list to each of the 14,286 members of the sample. The bigger the sample, the highest the precision so, doing this we obtain a short list of 4 or less pictures. Again, we can guarantee with confident level of 99% that the winner picture is in the list.

To choose on a list of 4 pictures is an easy job. The 4 pictures can be sent to the whole audience to the last voting.

The example provides an instance when the algorithm is run twice. In other embodiments, the algorithm may be run as many times as necessary to obtain a desired confidence level. In some embodiments, an algorithm may be run only a single time, two times, three times, four times, five times, six times, seven times, or more, depending on the desired confidence level and other parameters. In some instances, each time the algorithm is run, the list of proposals may decrease in number. For example, the first time an algorithm is run, a first element set may be provided to the population. The second time the algorithm is run, a second element set may be generated which is a 'short list' of the first element set. The second element set may have fewer members than the first element set. In some embodiments, a subsequent element set may have fewer members than an earlier element set. For example, a third element set may have fewer elements than the second element set or first element set; a fourth element set may have fewer elements than the third element set.

In some instances, the algorithm may be run until a single outcome remains at a desired confidence level. In some instances, the algorithm may be run until an acceptably small number of outcomes may remain at a desired confidence level (e.g., acceptably small may include a number of outcomes that the entire population may vote on, such as but not limited to 10 or fewer, 7 or fewer, 5 or fewer, 4 or fewer, 3 or fewer, 2 or fewer, or 1 outcome). In some instances, initial runs of the algorithm may have slightly higher confidence values than the overall desired confidence level.

In some instances, an algorithm may be run until a predetermined objective is attained. If the predetermined objective is not yet attained, additional runs of the algorithm may occur. For example, running the algorithm may include utilizing the statistical estimation from the previous round to create a subsequent option set, with aid of a processor, comprising one or more options from the previous option set. In some instances, the previous option set is the first option set. The algorithm may also include dividing, with aid of a processor, the agent set into a plurality of subsequent agent subsets, wherein the agents belonging to one or more individual subsequent agent subsets of the agent set are randomly selected; dividing the subsequent option set into a plurality of subsequent option subsets that constitute the subsequent option set; assigning one or more different subsequent option subsets to each respective subsequent agent subset; providing all the options in every assigned subsequent option subset to each agent within the respective subsequent agent subset; and/or determining a conclusion based on the reaction of the agent set if the predetermined objective is attained. If the predetermined is not obtained, the algorithm may be repeated.

The above-explained Example 2 is a very concrete case of what a TV Show host can do using the group reaction evaluation systems and methods. However, the group reaction evaluation system gives a lot of possibilities for TV programs. We list some examples:
  Knowing the opinion of the audience on any subject
  Asking an open question to the audience, get all the answers and choose the best of them
  Asking 500 yes/no questions in parallel to the audience
  Give the audience several options among which they can choose
  Allow the audience to manage the show trough "avatars"
  Knowing the level of interest of the audience on the subjects treated on the show at that moment
  Use information about audience interests to advertising focus
  In sports events,
    Knowing the opinions of the team's fans watching the event
    Allow the audience to manage strategies and tactics trough "avatars"
  Programming management according to audience preferences
  Online shopping: knowing audience preferences in every moment to adjust product offering accordingly
  Debate programs:
    Knowing in real time the opinion of the audience about the participants
    Receive proposals from the audience of questions to the participants (real time)
    Ask the audience questions from the participants in real time
  Other possibilities for new types of programs:
    Interactive reportage evolving according to audience preferences in real time
    Theater play with participation of the audience as characters In current TV standards, different parts of the applications using group reaction evaluation systems can run in both in second screen apps and in the TV screen. As soon as interactive TV evolves, group reaction evaluation systems may be integrated in future interactive TV features.

Group central management mode can be used too in marketing campaigns for example before launching a new product. The marketing department can contact to potential customers to better know about new features that would be of their interest. This can be done both in synchronous mode (the clients answers question, express preferences on line at the moment of being asked) or asynchronous mode (options are there and clients can choose when they want).

Combinatorial Design

Combinatorial design is a central managed group mode with special characteristics. The central management offers to the group the possibility of choosing among different options grouped in some dimensions linked between them the way that choosing an option in one of the dimensions restricts or conditions the options in the other dimensions.

Example 3

In the context of the launch of a new mobile phone version the company wants to know the opinion from future users about the features more interesting for them. Through an App using the group reaction evaluation system, the company can offer to potential clients all the universe of options grouped by some dimensions with many options for each dimension.

The different dimensions can be linked in a way that if one option is chosen in one dimension restricts the other dimensions options and so forth. For example, if you choose the smaller screen option you can't have HD video on it or, if you choose the basic-price reduced package you can't get USB connector. The potential clients can propose many different product configurations within restrictions and then, using the group reaction evaluation systems and methods, choose the best.

In some embodiments, an element that may be presented to groups of members may include a single feature (e.g., HD video or no HD video, USB connector or no USB connector, small size or large size). For example Element A presented to Group A may include Option 1; Element B presented to Group B may include Option 2; and Element C presented to Group C may include Option 3.

In other embodiments, an element that may be presented to groups of members may include a cluster of options (e.g., smaller screen option with no HD video, or larger screen option with HD video). When an element includes a cluster of options, each element may have a unique cluster of options. For example, Element A presented to Group A may include Options 1 and 2 together; Element B presented to Group B may include Options 2 and 3 together; and Element C presented to Group C may include Options 1 alone. The options may be bundled in unique ways for each element. Thus a unique combination of options may be presented to each group and the group may respond to the bundled combination of options as a single unit.

Group Document Edition

In another embodiment a group can jointly edit a document. This document may be created by a group of people. Each person may propose text or any other editing action over the document and the group may decide on what text or any other editing action over the document to include, change, correct, etc.

The possibilities of using the group reaction evaluation system for marketing are huge. Apart from the above-explained examples, the marketing departments can be connected to potential clients through apps that provide two ways communication:

Sending proposals of new features to the clients
Receiving proposals of new features from the clients
Polling about any feature of new versions
Polling about the interest for current features
Polling about opinions of the clients about competitors
Launching hyper-focused marketing campaigns by using all the information about client's interests
Hyper-focused advertising Self Managed Community Other models can be built using group reaction evaluation systems and methods, such as those described herein. One example of such a model is the "community self-management". In this model a community uses the group reaction evaluation system not only to estimate the community position (reaction) respect to a set of elements but to decide what to do at any moment.

We've seen in the group central management mode Example 2 how the TV Show manager may set the pace of the communication with the audience. The manager may decide the interactions between the Show and the audience and group reaction evaluation system may allow those interactions to happen in real time.

Figure 5:
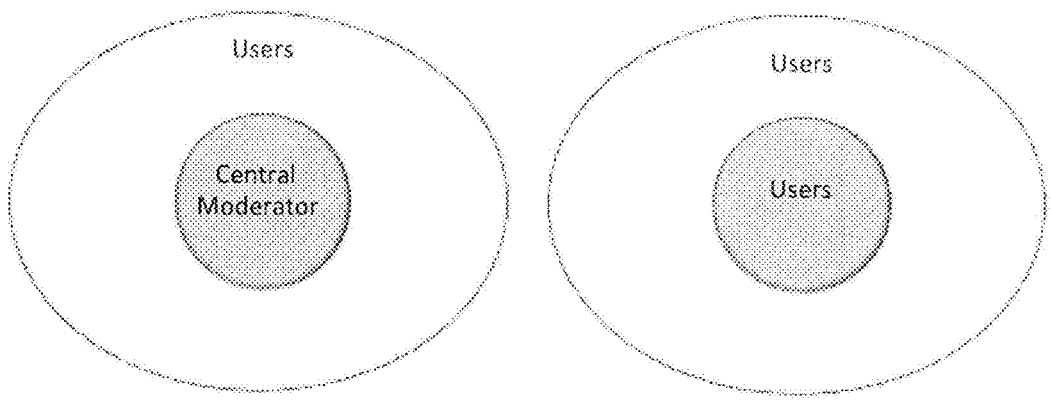
FIG. 5 provides examples of various types of moderations within a community.

Given that using group reaction evaluation system it is possible to know in real time the group opinions, ideas, interests, and in general the group will, it is possible too that the decisions that are taken by the manager in the TV Show, that is the central management, may be taken by the group itself. FIG. 5 provides an example of the types of moderation, including a central management mode and a self-management mode.

Example 4 shows how a community uses group reaction evaluation systems and methods described herein to self-manage. A community may be provided. One or more members of the community may throw out options of queries that may be presented to the entire population. The queries may be initially screened by randomly chosen samples of the population in order to determine whether the queries should be presented to the entire population. The screening stage may select a fixed number of queries to be presented (e.g., top query, top five queries, top ten queries), or may select any number of queries that meet and/or exceed a predetermined threshold (e.g., any number of queries that exceed a 85% approval, etc.). If a query does pass the screening stage, the query may be presented to the entire population. In some instances, one or more members of the population may suggest one or more options for responses to the queries. One or more response options may be selected based on systems and methods described herein. The response options may then be presented to the population (e.g., dividing the population into groups and providing one or more of the response options to each group) using any of the systems and methods described herein. Thus, the population itself may self-manage by selecting queries to ask to the population, and possible responses to the queries.

Example 4

In accordance with an embodiment of the invention, a community of fans of a football team may be connected through an app using the group reaction evaluation system. Mid season team's performance may not be good and among the fans, the idea of changing the coach may emerge.

One fan can throw the idea out of changing the coach through the app. The group reaction evaluation system may automatically choose random samples and sample members who may be asked about whether or not the whole fan's community should be questioned about changing the coach. The random samples may be chosen with aid of a processor without requiring human intervention. The sampling may be truly random or may incorporate one or more criteria.

The group reaction evaluation system may deliver estimation of the fan's community interest in discussing about changing the coach. If positive, fans can use the group reaction evaluation system again to propose candidates lists, submit them to fan's community opinion, rank the lists and vote for the final candidate. It can also establish a discussion forum.

The group reaction evaluation system may permit the group to filter questions and answers, discerns when a question has to be addressed to a random sample user and presents it to this user in a special mode that permits the user to understand that he or she is not asked to answer the question but, to vote whether or not the question should be asked to the whole group. In some instances, a user interface presented a group member for when voting on whether a question should be asked to the whole group may have a different appearance or configuration than a user interface asking the group member to vote.

In fact, the group reaction evaluation system in this mode may permit the group to be expressed as a single person, by aggregating all the members' opinions in a group opinion.

Community Social Networks

Today we are used to using social networks that connect us to other people. We can add new "friends" to our network, we can share items with them, and we can know their opinions and express our opinions too.

The use of the group reaction evaluation system in a social network will allow us to connect to communities, not only to individuals and treat with those communities as individuals:

Add new communities to our social network
A community can decide to establish a relationship with other communities or with individuals
Being part of communities
Communities express its opinions, ideas, proposals to any individual or community on the social network
Communities share pictures or any other item with individuals or other communities
Communities can chat with individuals or other communities
Individuals to treat with communities
Communities to treat with other communities (see Example 5)
A community can decide what communities to follow up.
It is possible to establish relationships in which the elements (e.g. posts) generated by one group represent the best produced by the group (filtered by the group reaction evaluation system)

Negotiation Between Two Communities

The following example shows how two communities that have both common and divergent interests can negotiate to get the best outcome for their interests. The communities may or may not have directly opposing interests. For example, an option backed by one community may or may not be mutually exclusive of an option backed by another community. But it also shows the capacity of the group reaction evaluation system to bring solutions to complex demands.

In some embodiments, options in an option set may include proposals presented by two or more communities. A statistical estimation determined by the techniques described herein may include the acceptance rate of the proposals by the two or more communities. The two or more communities may have opposing interests. Methods described herein may be used as part of a negotiation technique. The technique may include utilizing a short list of proposals comprising one or more proposals, wherein the short list is generated based on acceptance rates.

Example 5

State authorities may plan to set a rubbish dump in the area close to two cities A and B. Citizens from both A and B try to lobby to convince authorities to put the dump far away from their city. However, A's lobby efforts might result in a dump location that B doesn't want and vice versa.

An App using the group reaction evaluation system may permit the two communities to dialog about the problem. A community member can propose a negotiation. The group reaction evaluation system may poll both communities and if they decide to negotiate, the group reaction evaluation system can work in negotiation mode:

When a citizen from A or B provides a proposal, the group reaction evaluation system may take disjoint random samples among the samples of both. The group reaction evaluation system thus can search for proposals that get more than 50% of acceptance by both A and B communities, maximizing the % of acceptance in both A and B communities and/or minimizing the difference of % of acceptance in both. Those criteria can be adjusted in a different way. A user of the group reaction evaluation system, such as an administrative user may be able to determine the parameters for acceptance for both communities. For example, different acceptance criteria may be weighted to provide an optimized or desirable outcome.

In the case of community negotiation the group reaction evaluation system may use different algorithms. In some instances, the members of the communities may come up with one or more proposals. In some instances, members of each of the communities may come up with the proposals. The proposals may form an option set. A group reaction evaluation system may cause the proposals to be presented to the different communities. In some instances, a group reaction evaluation system may provide a single most accepted proposal. Alternatively, a short list of proposals may be generated which may aid in a negotiation between the different communities. The short list of proposals may be generated based on acceptance rates from the various communities. In some instances, the short list may be selected based on acceptance rates of the proposals and/or the total number of proposals that may be provided within the short list.

Ground Up Skills

The group reaction evaluation system can be used as we have seen for public applications (e.g., TV shows, community's dialog, or marketing campaigns). It also can be used for private applications e.g. in management applications within a company. One of those applications might be for Human Resources (HR) management.

Example 6

The HR department can use an App that uses the group reaction evaluation system. That way HR may be constantly in contact with employees' mood, receive immediately feedback for every new measure or proposal, receive proposals, set up discussion forums and in general, connect with the whole mass of employees, and/or with some departments separately.

The group reaction evaluation system may provide another interesting feature, ground up skills: given that employees are using an internal application that uses the group reaction evaluation system, that application will track employees' questions, answers, proposals, contributions and evaluations of the whole group about each of them. This may store great information about the skillset of each employee according to the opinion of the different groups and its evolution. Even in the case of employees connected with customers we'll have a track record on the opinions of the customer about them. We call this "ground up skills". For example, it may be tracked that certain employees provide suggestions or proposals that are often selected by the collective group. It may also be tracked that certain groups or departments provide certain types of proposals that are or are not often adopted by the group.

Election of a Candidate Among the Members of a Group

Applications using the group reaction evaluation system can choose among a big list of candidates the most voted by the whole group, e.g. each one of 10,000 candidates sends a minute video. The group reaction evaluation system may estimate the most voted one in a fraction of a minute.

The group reaction evaluation system may provide a speedy response for selection from a large list of candidates. For example, the group reaction evaluation system may provide a response within 1 hour, 30 minutes, 10 minutes, 5 minutes, 3 minutes, 2 minutes, 1 minute, 30 seconds, 10 seconds, 5 seconds, or 1 second. The group reaction evaluation system may provide one or more selection automatically without intervention of a human. A server processor may aid in the selection of the large list. A large list of candidates may be any number including but not limited to greater than, less than, or equal to 10, 50, 100, 500, 1,000, 5,000, 10,000, 50,000, 100,000, 500,000, or 1,000,000 candidates.

Model of an Application Using a Group Reaction Evaluation System

In the following example we will show a particular case of an application that uses a group reaction evaluation system in accordance with an embodiment of the invention.

Example 7

This application might be called "democratic community self-management" and it may be offered to communities to organize themselves and helping them in achieving their objectives. This application might run in any device, which may include a personal computer, mobile phone, tablet, interactive TV, or any other device described elsewhere herein or capable of a networked connection.

This application may work in a Timeline mode and may allow a community to aggregate all its members. The application may function in such a manner so that the entire community can express itself and act as an individual. Using this application a community can:

Express opinions
Take group decisions
Propose questions to itself
Decide on actions
Execute actions
Negotiate with other communities This application may be like a chat in which the messages most voted by the community among all the messages proposed by its members are published to the whole community.

Basic Cycle:

For this example we assume that there is a big set of individuals connected to the app.

At the beginning of the cycle an individual of the community may send a message (probably many other are doing the same at the same time)

Each one of those messages may be sent to a random sample. Every individual (agent) of the sample may judge whether or not the message should be published (sent to the whole group) or not. Different individuals may receive different messages if they are in different samples. A whole group may be divided into sample groups, each containing one, two or more members.

The "poll" messages that is, the ones that are sent by the group reaction evaluation system to the random samples to decide on passing or not to the whole group are clearly differentiated from the messages that are published to the whole group (e.g. red color).

The group reaction evaluation system may rank the messages from more voted to less voted and choose the "n" (adjustable parameter) most voted. It is possible for any user to see the messages that passed a certain threshold of votes but not enough to be in the public list.

When the users have read the messages, the cycle may repeat with new messages or proposals.

They can be multiples of messages. Examples of two types of messages follow:
1. Basic Messages
   Plain messages
   They don't change the app state
   They don't modify the cycle
   E.g. informative message: "tax authorities plan to raise taxes for personal income over 150,000 USD". This can be or not of interest for the community depending on whether or not there is a significant group with this personal income level. But in any case this will not affect to the app state or changing the cycle.
2. Control Messages
   They trigger actions, e.g. to launch a public poll. If the initiative is approved the app changes the state. The users move from readers to voters.
   The cycles' changes Example 8

Open question. An example is provided below where an open question may cycle through the screen of a smartphone running an app with the group reaction evaluation system. The user interface displayed is provided by way of example only. Furthermore, the user interface may be displayed on any type of device, which may or may not be a mobile device, and the format may or may not vary depending on the type of device that the user interface is displayed upon.

The user interface may include a color code for helping in identifying different types of messages, in concrete to differentiate between messages for the whole group and messages for the members of a sample to be voted. Alternatively, there is no color differentiation.

Figure 6:
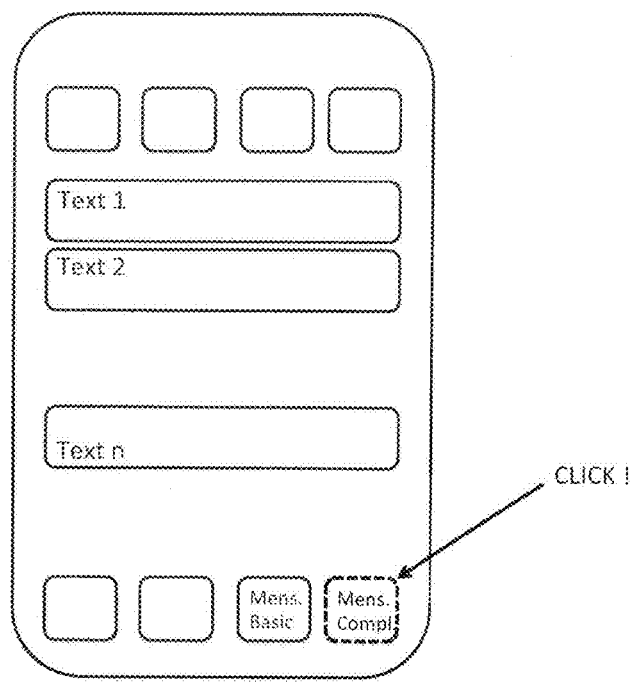
FIG. 6 provides an example of a user interface display for a question cycle in accordance with an embodiment of the invention.

FIG. 6 provides an example of a user interface display for a question cycle in accordance with an embodiment of the invention. A normal cycle may be provided with no red elements. Text may be provided. The text may include explanatory text or description of options. Options may be provided for different types of messages or cycles. For example, a "basic message" and a "complex message" option may be provided. The user may select the "complex message" icon. The user may select the "complex message" icon. Any selection on a user interface may be performed via any user interface device, such as a touchscreen, voice command, keystroke, or clicking on the icon.

Figure 7:
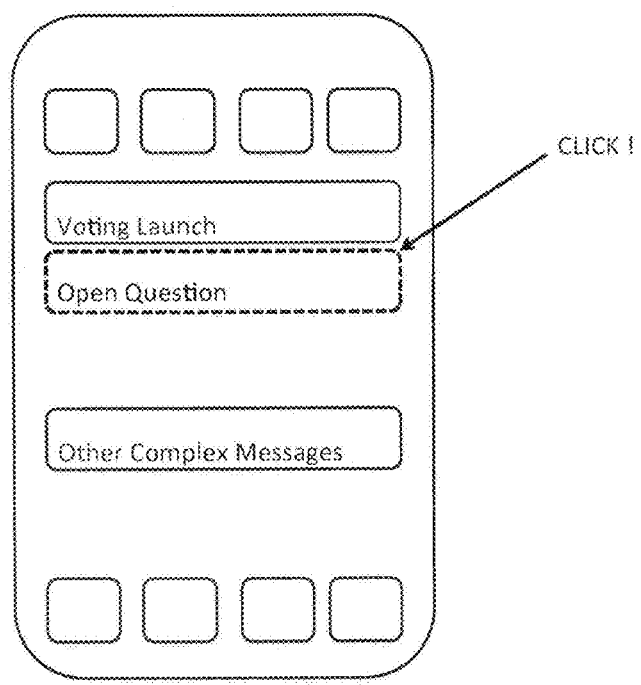
FIG. 7 provides an additional example of a user interface showing various options.

In FIG. 7 the app may show the user a list of different options for a complex message. The user chooses one and clicks the icon. Examples of options may include a voting launch, open question, or other complex messages. A user may select an open question option.

Figure 8:
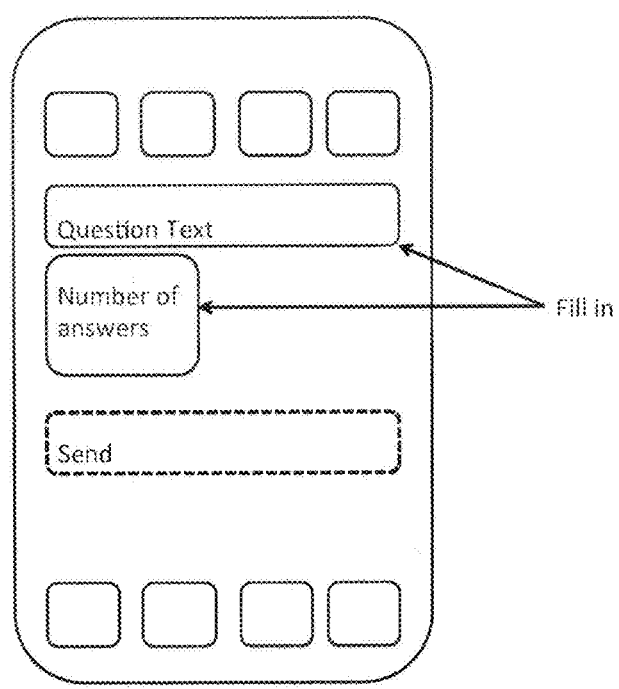
FIG. 8 shows another view of a user interface wherein a user may determine the question in a question cycle.

In FIG. 8 a user interface may present an option where the user may write the question and provide the number of answers that he or she wants to be published. The user may fill in the question text. The user may frame the question in any manner, as an open question, a multiple choice question, or a binary answer question. The user may also fill in an option for the number of answers. Any number of answers may be provided. Alternatively, a limit to the number of answers may be provided. Click to send.

Figure 9:
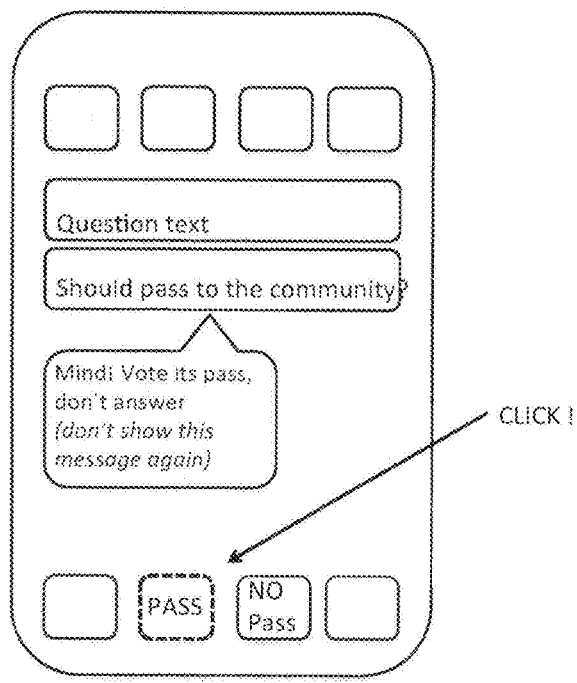
FIG. 9 provides an example of a user interface display in which an agent who is part of a sample is asked to vote whether or not a question should pass as a question of the community.

In FIG. 9 we see the screen of an agent that's part of a sample who is being consulted about whether or not this open question should be asked for the entire group or not. The system clearly warns the agent that this is not a question to be answered, instead, just to vote its pass to publication or not. For instance, pass/no pass options are provided. Click to send.

In the event that supposed that this is the most voted question, or a subsample of the general population provides a sufficient pass percentage, the question may be posed to the general population. In some instances, only the top voted question or top several voted questions may be presented. For instance, only the top 1, 5, 10, 50, 100, 500, or 1,000 or more questions may be provided. In some instances, only questions that pass a certain approval threshold may be presented. For instance, only questions that exceed a 95% approval, 90% approval, 85% approval, 80% approval, 75% approval, 60% approval, or 50% approval may be presented, regardless of how many. In some instances a combination of number of questions and approval threshold may be considered in determining whether to pass the question on to the general population.

In some embodiments, one or more duplications to questions may be provided. The duplications may be removed. In some instances, one or more algorithm may be utilized to assess whether a question is duplicative. In some instances, a question may be deemed substantively duplicative even if the exact wording may vary. In some instances, one or more key term may be assessed in order to determine whether a question is duplicative. If multiple users provide duplicative questions, the users may be tracked and/or credited with providing the question.

Figure 10:
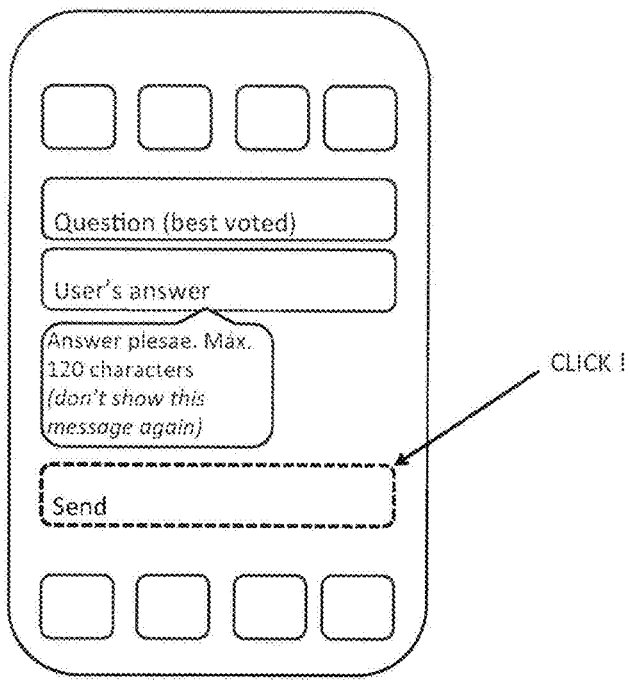
FIG. 10 provides an example of a user interface for users receiving a most voted question.

FIG. 10 provides a screen with a user interface of all the users receiving a most voted question. In some instances, all users in a general population may see a single most voted question. In other embodiments, the general population may be divided into a plurality of sample groups, and each sample group may view a different question that has been passed onto the general population. In some instances, each sample group may be presented with a single question, or may be presented with multiple questions. The questions may be provided in parallel or serially. A sequence of questions may or may not be predetermined.

The question may be presented in any form. For example, an open-ended question may be presented. The user may enter the user's open-ended response. Alternatively, a multiple choice or binary question may be asked, and the user may select from a number of options. The user may answer and click to send. In some instances, there is no other option rather than answering the question. Any other option may get frozen until this action is executed. This situation finishes when we reach the maximum of questions that can be attended in this moment, depending on the amount of questions we can ask and the number of evaluations that any user can make.

Figure 11:
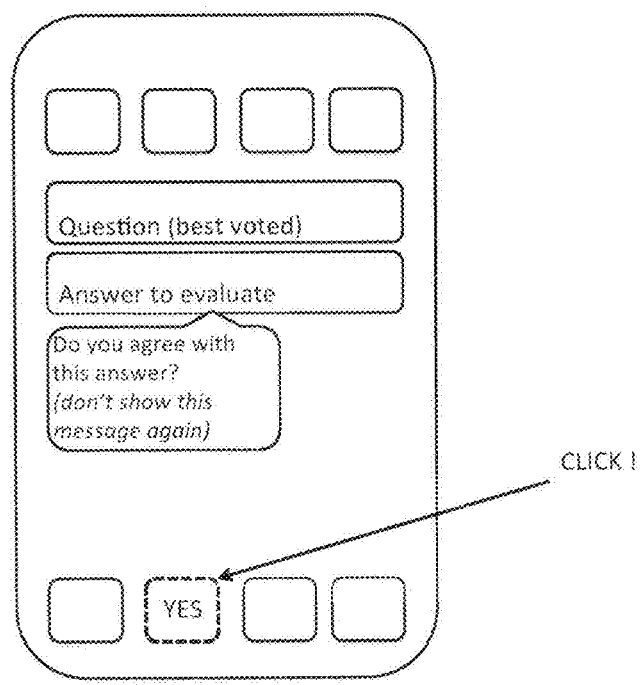
FIG. 11 provides a user interface illustration where an agent receives a question and answer to evaluate.

FIG. 11. In this screen an agent from a sample receives a question and an answer to evaluate. The user may be presented with a binary option whether to agree—'yes' or 'no' and click to send.

In some instances, a plurality of answers that had been provided by the population may be evaluated. For example, in response to the most-voted question, 100 different answers may have been provided by users. In some instances, duplicative answers may be provided. In some instances, duplications in answers may be consolidated into a single answer. The duplications may be removed prior to presenting a set of answers to a group. If multiple users had provided the same answer, the users may be credited with providing the answer. For example, if an answer is ranked the highest, and multiple users had provided that answer, each of the multiple users that provided that answer may be credited with providing the highest ranking answer.

The general population may be divided into sample groups (e.g., 100 different sample groups). Each sample group may evaluate whether they agree with an answer. Each sample group may be presented with a different answer. The sample group may be presented with a binary option whether to agree or not with the answer. The answers may be ranked according to highest rate of agreement. In some instances, the top answer may be selected as the most voted answer in the sample. In other embodiments, a short list of top answers (e.g., top specified number of answers, such as top five or ten answers; answers passing a predetermined threshold, such as answers having an 85% agreement rate or higher, or any combination thereof) may be generated and additional sample group division and evaluation may occur. Based on the subsequent round of voting, the top answer may be selected or additional rounds of voting may be provided. In the end, a most voted answer in the sample may be selected. One or more processor, such as a server processor of the group reaction evaluation system, may tally user responses and perform one or more series of steps to determine the most voted answer to the question.

In some embodiments, each member of a sample group may receive and/or view the user interface with the queries simultaneously. Each member may respond to the queries within a short time frame. A display of each member's device may show the queries at the same time. Alternatively, the queries may be viewed by the members and the members' convenience. Some time may elapse for the responses from all the members to be collected. In some instances, a preset time period may be provided, during which the members to provide the responses to have them considered.

Figure 12:
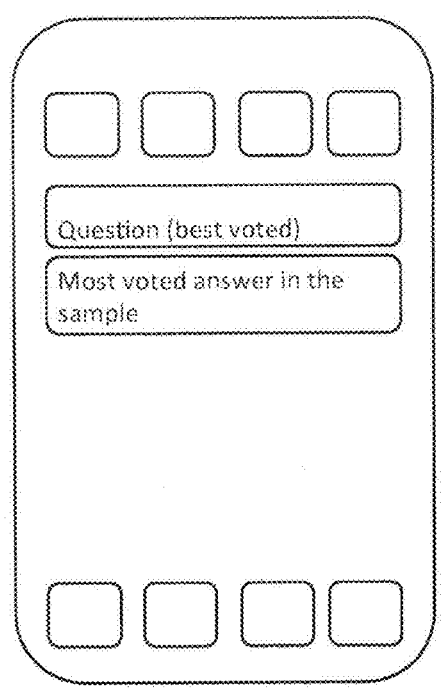
FIG. 12 provides an example of a user interface where a most voted answer is provided.

FIG. 12 this screen shows the question and the most voted answer in this sample. The most voted answer may be shown to the users who voted on the answer. The most voted answer may be shown to the user who posed the question. The most voted answer may be shown to an administrative user of the system.

A similar process is possible for yes/no questions, or any other applications described elsewhere herein.

Primary and Secondary Algorithms

Secondary algorithms may be used to bring additional solutions. This case may be "using Agent's characteristics to run secondary algorithm". In this example we want to estimate the group reaction prior to deciding on whether or not to send a proposal to the group. A large amount of proposals may be provided among which we need to know which of them will pass a certain threshold of acceptance.

The reactions can be two types: positive or negative. We have set the following parameters:

A target reaction=positive reaction

A target threshold of 85%, meaning that we will send to the group only the proposals that will have a positive reaction > or =85%

A statistic reliability of 96%

We run the primary group reaction evaluation system algorithm to the group to estimate its reaction respect to the element set (the set of proposals in this example). The group reaction evaluation system may randomly chooses samples, the samples' Agents may be exposed to the element set (set of proposals), and the samples' reactions set may be obtained, that is the set of proposals ordered by its proximity to the target threshold.

In one example, the results may show us that there is no positive reaction>=that 85%. In fact, the element that gets the highest score gets 55%. We'll call this element "element C" and the correspondent sample in which it gets such score, "sample C"

Assuming we have previous information about the Agents we can train a classifier that discriminates the Agents of sample C that have a positive reaction. We have then a way to distinguish Agents that have a high probability of having a positive reaction, and we can establish the hypothesis that certain Agents in the group will have a positive reaction.

However, a heuristic method like this doesn't necessarily give sufficient reliability. We have an undetermined estimation. To have a 96% statistically reliable estimation we may run the group response algorithm again to a new randomly chosen sample big enough to give us a significant sample when we apply the classifier.

This way we may obtain sample Agents that fulfill classifier characteristics. Element C may be exposed again to these Agents. Normally this should give us a reliability higher than 55%.

We can apply the same method on 2nd, 3rd, or additional elements on the rank obtaining subsets with higher probability of positive reaction.

Other Adjusted Parameters

Apart from the obvious adjustable parameters of the group reaction evaluation systems and methods like the size of the samples, the shot lists elements, the choice among its different outputs, etc. there are other possibilities. We non-exhaustively list some examples bellow:

Weighted Vote

Skills ground up is a particular case of the valuable information the group reaction evaluation system can store. Given that users of the applications are constantly involved in questions, answers, proposals, contributions etc. we can differentiate among different types of users and give different value of their "voting" according to its track record. The vote of a user with higher "contribution score" or better quality (community approval) in its proposals can have higher value than the vote of a user with lower contribution score. This is especially useful when there are different topics for which the community recognizes experts who have "voting power."

"Bad" Proposals Management

The group reaction evaluation systems and methods can use this track record to manage proposals that come from individuals that have a track record of "bad" proposals that is, proposals with low community approval. It is possible to adjust the group reaction evaluation system to assign smaller random samples to those proposals so they will be rejected with minimal impact on the community.

Chat Functionality

In some embodiments, the systems and methods provided herein may include a chat functionality to connect a community leader with his/her follower's community.

A particular use of the group reaction evaluation system may be for example a "chat" type application that permits the followers of a leader, for example an opinion leader in any social network, for example Twitter or Facebook, to communicate with their leader, aggregating all or part of their interactions with the leader like a unique personality.

Today it is common for certain people to have a large number of followers in social networks. Journalists, politicians, sportsmen or sportswomen, artists, celebrities, bloggers, business leaders, etc. are followed by large numbers of people, (e.g., thousands of people) interested in their opinions, live, events, or any other subject they publish in social networks.

Applications using some or all the aspects of the group reaction evaluation system may permit aggregation of the interaction of the followers with their leaders. The leader may receive communications representing, not the reaction of a specific follower but, representing for example the reaction of the majority of them.

For example, systems and methods provided herein may ask the leader the most voted question among all the questions proposed by the follower's community. Thus, the collective community's question(s) may be presented to the leader. The questions may be selected in accordance with embodiments of the systems and methods described herein. For example, a large number of questions may be provided to a large population. A statistical estimation may be formed based on the reaction of population subsets to subsets of the questions. A conclusion may be drawn based on the statistical estimation. The conclusion may include a question or a short list of questions to be provided to the leader.

Furthermore, systems and methods provided herein may ask the leader the most voted question among all the questions proposed by a subset (for example the followers connected in a specific moment) of the follower's community.

Additionally, the systems and methods may include sending the leader the (N) most voted proposal(s).

In some embodiments, systems and methods may estimate the reaction of the follower's community to a proposition, question, answer, or any other leader's action.

All or any of the above exposed may be in a "chat" type application that communicates the leader with the followers.

The leader may be any person or any other entity, representing itself or on behalf or any other. An entity may be in this context any public or private organization, organism or administrator or administrator's group from the community.

In the same chat may be possible to incorporate (e.g., following a previous agreement), other leaders and other follower's communities, creating a more than two participants chat. In some instances, any specified number of participants may be provided in a chat. The chat may be an interactive experience wherein based on the leader's response additional follow-up questions or other content may be provided to the leader. In some instances, the follower population reaction to answers provided by the leader may be gauged in real-time. Based on the reaction, additional questions or content may be generated and/or provided to the leader.

Any aspect of the group reaction evaluation system may be used to manage the interaction of the follower's group with the leader.

Chat Type Exemplary Embodiment

After login the user may have access to a screen in which he or she can create and modify his or her profile, access the hottest chats at the moment, connect with his or her favorites leaders, search for new ones (an option included in the favorites option), connect with his or her followers and look for messages, schedule or any other type of asynchronous communications There is a red button to access to notifications. By clicking in this button the user access to another screen where he or she can see if one of his or her followed leaders (favorites) has any notification for him or her.

By clicking in the button of one of his or her favorites (the leaders followed by the user), the user may have access to a "timeline" type screen in which different types of messages can appear:

1. Basic, ordinary chat messages. Those can be messages from the leader or from the follower's community. They are pure chat. They may or may not be very relevant and they can flow either from the leader to the community, the community to the leader or the community to the community. It is possible too (as we will explain in depth later) that the community gets subdivided into two or more sub-communities that chat between themselves.

2. Important, messages containing relevant communications from the leader to the community. When the leader wants to catch the attention of the community for a relevant question, the screen shows a different type of message. This message can be differentiated either by using a different part of the screen or using a color code, different type of letters, etc. When a message like this appears, it may interrupt the flow of the basic, ordinary chat messages.

3. "Filtering" messages. Systems and methods herein (e.g., Demorank as it has been explained) may use algorithms to statistically estimate group will. In the chat mode application it chooses random samples among the follower's community to ask every individual in each sample about whether or not a communication proposed from the followers to the leader has to pass or not. Therefore, time by time, a user will receive a "filtering" message, that is, a message asking him or her about whether or not a proposal of communication from the followers to the leader should pass. The mechanism may include one or more of the following:

A user among the follower's community proposes a communication to the leader, example: "we'd like to discuss with you about your next performance", (or "yes", or "we'd rather prefer you to include different songs on your new disc"). Systems and methods (such as those described herein, e.g., Demorank) chooses random samples among the follower's community and sends to every individual in the sample a "filtering" message: "should this question (or this answer) pass or die?" in a simple and graphic manner e.g. with icons to click. Each individual on each sample votes each option and the system shows the most voted option. More information can be available too for the follower's like the ranked list of the most voted options, what happened with every user option (percentage of votes obtained, etc.)

The "filtering" system applies too to the "important, relevant" messages. The leader can ask the follower's community to decide, to propose, or simply to ask a question. The same filtering system can be applied to decide, propose or ask questions.

Sometimes a communication may be considered so relevant that it has to be voted by the entire community. The leader can decide that this or that question has to be voted by the entire community. It is also possible to adjust the system to run two statistical "filtered" rounds and one "whole community voted round" that is, the system runs a first round in which it obtains a list of the most voted options. In a second round it will shorten the list. Finally, a short list can be presented to the whole community to easily decide into a small number of options.

It is possible too, in this Chat type of applications using the system, to subdivide the follower's community into different groups by any type of known characteristics. Every sub group may have its own entity and can communicate with the leader or among them the same way the entire community communicates with the leader that is, as a single person.

This division of the followers set into different follower's subsets can be used for different purposes. In the following "chat mode" example we include an example of follower's set subdivision to differentiate between men and women. Using this possibility the leader can chat independently with both and both can communicate independently between them and with the leader.

A totally different use of subdividing the follower's group using the known characteristics of the individual is explained bellow. This option is a particular case of use of the system feature already explained in regarding the "secondary algorithm"

Subdividing the Follower's Community (Follower's Set) into Different Follower's Subsets Each of One of these Follower's subsets having common known characteristics to solve the Problem of not Reaching Enough Consensus:

In one example, let's assume that in one of the communications from the follower's community (follower's set) to the leader, there is not a clearly winner option. Suppose there has been established the threshold in 55% positive votes and only 24% has been reached. If previous information about the followers has been gathered, a classifier can be used that discriminates the followers depending on its characteristics. The systems/methods may be adjusted to automatically subdivide the follower's set into follower's subsets based on similar characteristics of the follower's composing each subset. Based on that similarity it may be estimated that in each subset there will be higher consensus. Running the systems/methods again on those subsets will confirm this assumption and N follower's subsets will be returned, each having a higher consensus on the best option to be communicated to the leader.

Then, N options may be provided, each having a certain acceptance rate from the follower's community. Example:

The community may be divided into men and women, in this example 50%-50%. When the methods (e.g., Demorank) are run separately, we get for the option a 60% of men votes and for the option B 65% of women votes. For the whole follower's community the option A has an acceptance rate of 30% and the option B has an acceptance rate of 32.5%.

This subdivision of the follower's set into different subsets can be done in two different ways:

a. To run all the process from the beginning with disjoint partitions, that is, subdividing the follower's set into follower's subsets before starting with the random samples poll and b. To run the process first on the whole follower's set and, if there is no "winner option", subdivide into disjoint partitions or subsets and run the methods (e.g., Demorank) again.

Two "Random Samples" Rounds Plus a Whole Community Round:

This is one possible use of systems and methods provided herein (e.g., Demorank). In some instances, it may be desirable to have certain guarantee that yield a high precision in the consensus reached. The method may be adjusted to automatically run twice using randomly chosen samples and then run again consulting the resultant short list of options to the whole community.

Any of the features of the systems and methods can be used to manage the interaction between the group and the leader.

Sponsorship:

Sponsors can be invited to participate in a famous person's chat. For example, gifts can be offered for the best winner proposal from the followers, meeting a triple proposal: income for the leader, marketing for the sponsor and satisfaction (stickiness) for the followers. It is possible too that the gifts are offered to the "no winner" community at a discounted price with better discounts to the followers whose proposals achieved a better ranking.

The use of applications that use some or all the aspects of systems and methods provided herein permits to aggregate the interactions of the follower's group with the leader. This way the leader can receive communications that express, for example the reaction of the majority of the followers.

Examples:

Ask to the leader the most voted question or the N most voted questions out of the set of all the questions proposed by the follower's community.

Ask to the leader the most voted question or the N most voted questions out of the set of the questions proposed by a subset of the follower's set, for example, the followers that are connected at a certain moment.

Answer to the leader the most voted answer or the N most voted answers out of the set of all the answers proposed by the follower's community.

Answer to the leader the most voted answer or the N most voted answers out of the set of all the answers proposed by a subset of the follower's set, for example, the followers that are connected at a certain moment.

Send to the leader the most voted proposal or the N most voted proposals out of all the proposals from all the followers or a subset of the follower's set Estimate the reaction of the followers to a proposition, question, answer, or any other action of the leader Send to the leader the most voted comment, idea or whatever communication out of a set of comment, ideas or whatever communications proposed by the follower's community.

Send to the leader the most voted comment, idea or whatever communication out of a set of comment, ideas or whatever communications proposed by the follower's community by a subset of the follower's set, for example, the followers that are connected at a certain moment.

All the above described can be used in a "Chat" type application that communicates a leader with its follower's group.

The leader can be any person or any other entity acting on his own behalf or representing other entity. An entity may be any organization private or public, companies, institutions administrators or groups of administrators of the community.

In the "Chat" type application other leaders and follower's communities can be added if agreed, creating a chat with more than two participants.

Leader Driven Chat Type Application

A particular case of chat type application is described hereto. If in the models above described different types of communications and several rounds can take place at the same time, allowing to "followers-to-followers" communications as well as communications between leader and followers and some filtering rounds can cross with other filtering rounds, in the present model there is only a two-way communication traffic, and only one filtering round at a time. The leader gets the control in every moment and the communication is either leader to followers or followers to leader. However, the leader has the option of open the dialog, permitting the followers to chat among them.

In this model the leader can be an administrator who controls the timing all the time. The system works in a series of rounds e.g. "question→voting→answer" or "proposal-→voting→result" basis.

A typical screen of this mode of application might have "two-modes screen": reduced and extended. In reduced mode the screen would show just questions, answers and filtering messages (the system asking to the user to vote whether or not the proposed answer or question should pass or die). In extended mode, the screen would show much more information, e.g.:

The present question.
The previous question.
The winner answer with its voting percentage.
Other proposals and their voting percentage.
The ranking position and voting percentage of the proposal the user voted.
The ranking position and voting percentage of your proposal
The filtering messages Additionally, the screen in this mode can have a ticker line anticipating the next question from the leader to allow the user interesting in answering it. The user can close the ticker line if it is not interested in proposing answers.

Example 9

FIGS. 15 to 31 show screens of an application using systems and methods provided herein to connect a Leader with her followers' community. In this concrete case the Leader is a Pop Star with her fan's community and the application is a "Chat" type application.

Figure 15:
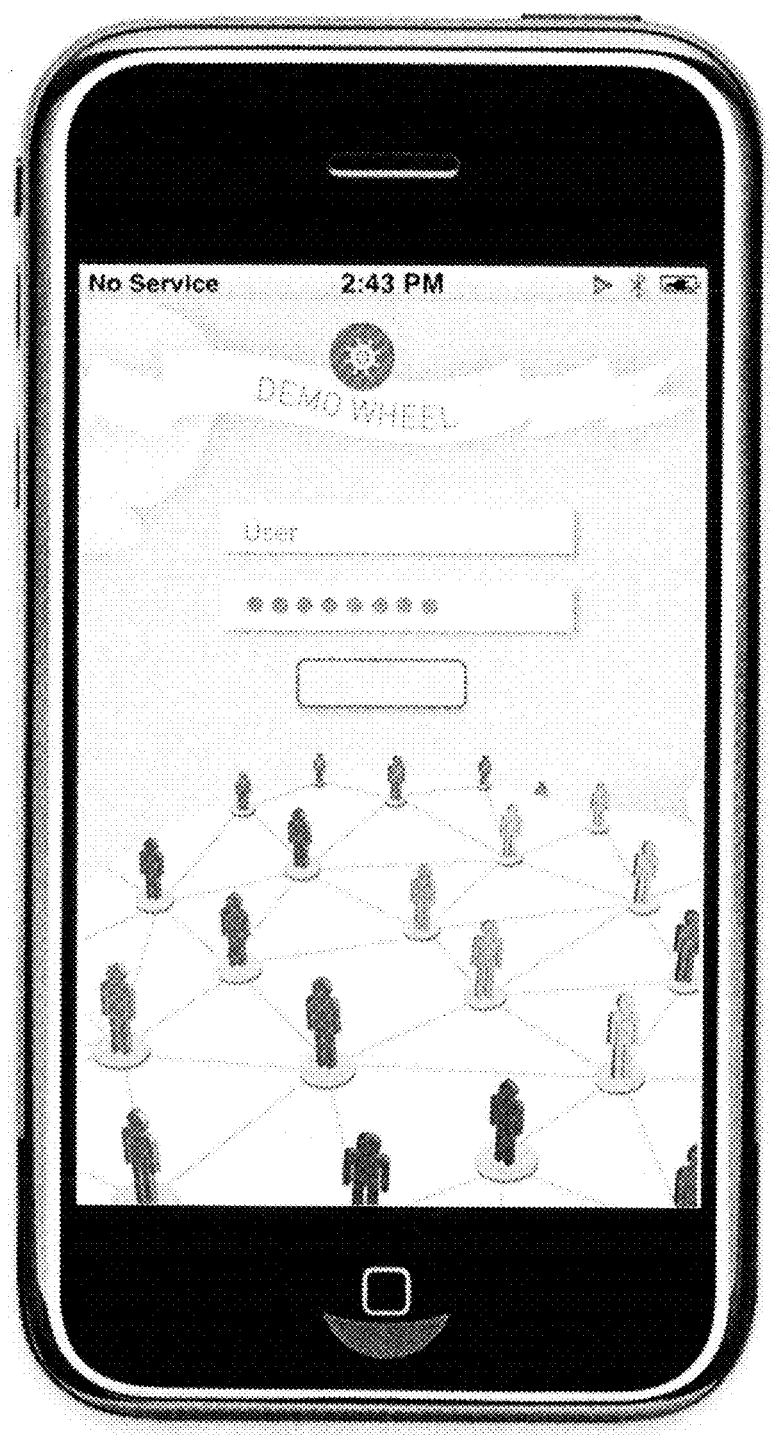
FIGS. 15 to 31 show screens of an application using systems and methods herein (e.g., Demorank) to connect a Leader with her followers community.

FIG. 15 shows an access screen of the application where a user can enter login and password to start using the chat.

Figure 16:

FIG. 16 shows an example of a first screen the user sees after accessing the chat. In this screen the user can create and modify his or her profile, access the hottest chats at the moment, connect with his or her favorites leaders, search for new ones (an option included in the favorites option), connect with his or her followers and look for messages, schedule or any other type of asynchronous communications (envelope icon). There is a red button to access to notifications.

Figure 17:

FIG. 17 shows an example of a Favorites screen where the user can see his or her favorites leaders and choose one to connect with by clicking on its icon. The user can also add or remove favorites.

Figure 18:
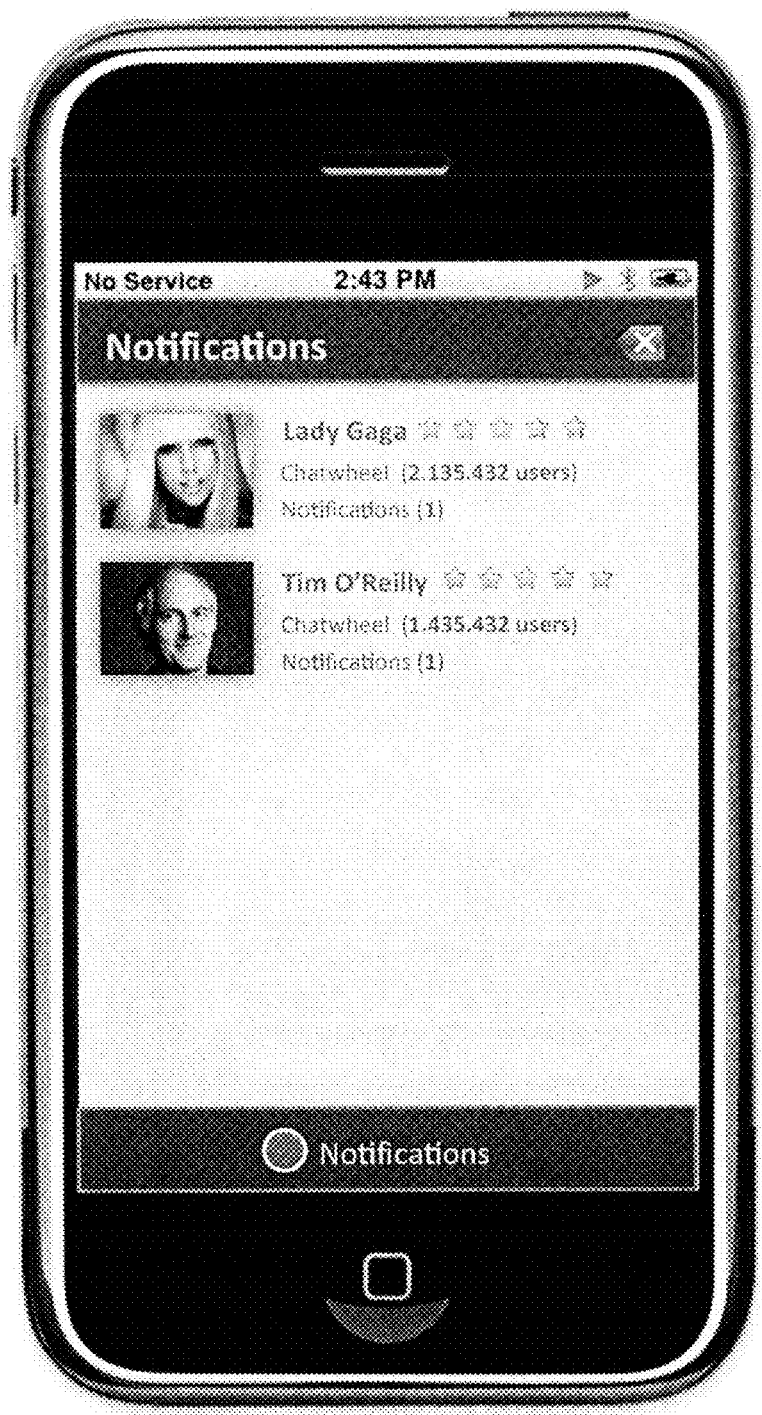

FIG. 18 shows an exemplary notification screen. The chat informs the user that he or she's got new notifications from two leaders. The user can click on notification's red button to access the notifications.

Figure 19:
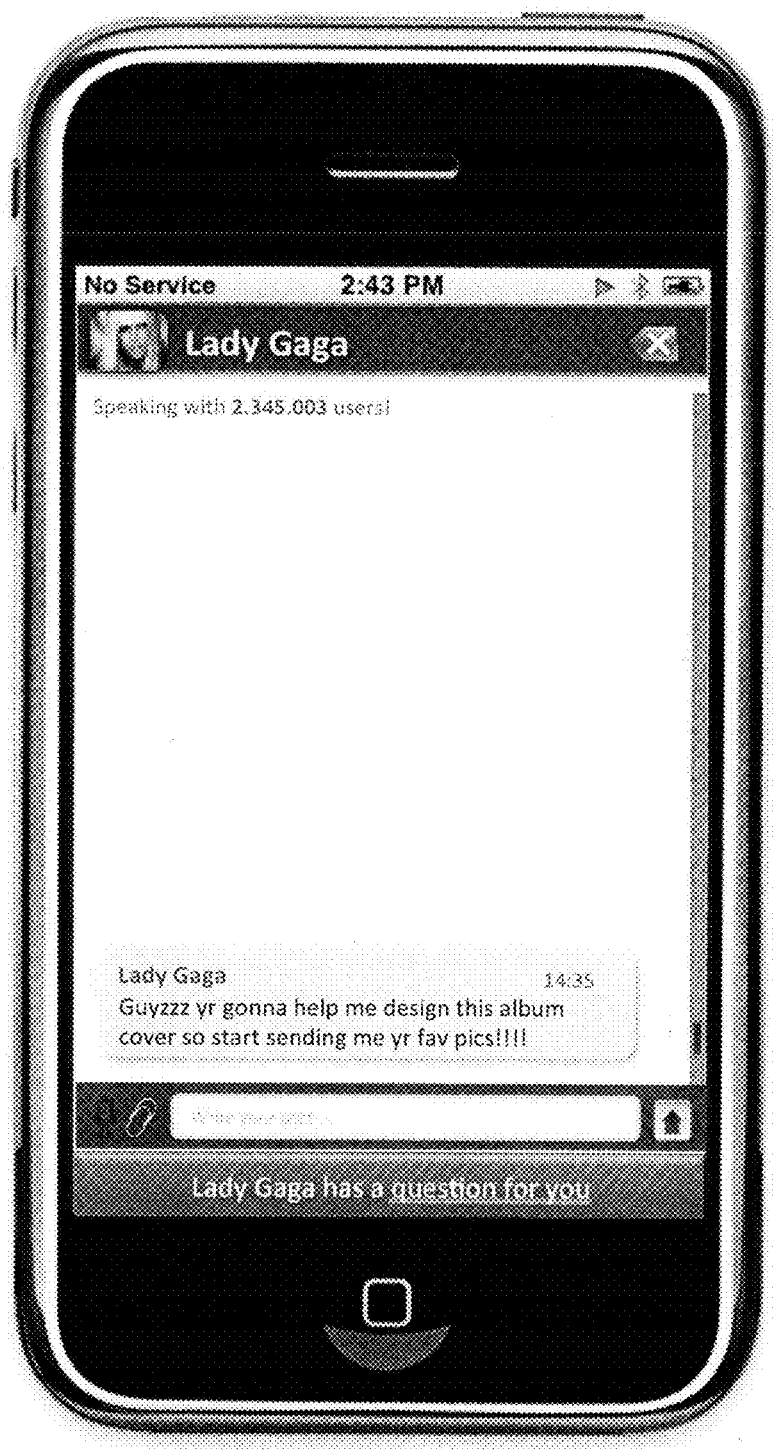

FIG. 19 shows a screen in which the user can see a question from one of her leaders (e.g., Lady Gaga), who is asking to the fan's community to help her in designing her new album cover by sending pictures. This screen offers to the user the possibility of sending posts. The system may use its algorithms to choose the post the most voted by the members of the fan's community that are connected at the moment. This screen may be a Timeline type screen. The new notifications appear in the lower part of the screen and the old ones are moving upwards. Notifications may be displayed in chronological or reverse chronological order.

Figure 20:

FIG. 20 shows a screen in which the user can see a proposal of answer to the leader (e.g., Lady Gaga). Some other fan may have proposed this answer and the system may select random samples among the fans connected at the moment to vote this answer. In the present screen, the user may be a member of a random sample so; he or she is asked to vote this answer.

Figure 21:
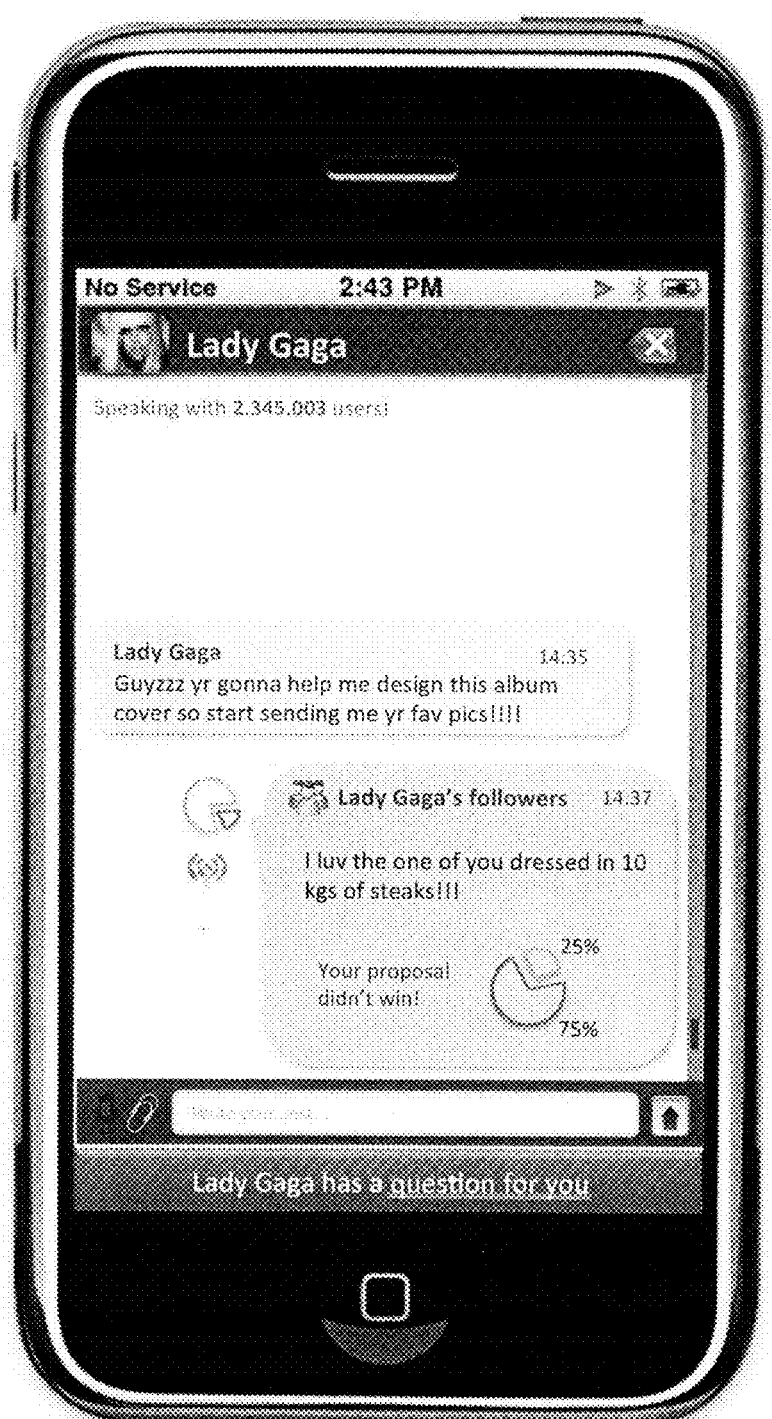

FIG. 21 shows the winner answer, and the percentage of votes achieved by it. The chat also informs the user that his or her proposal didn't win but the acceptance rate for his or her proposal was 25%. It also offers the user the possibility of publishing those results in social networks like Facebook or Twitter. This screen shows a particular case in which the user has made an answer proposal. That's not always the case. A user can be asked to vote as a member of a random sample although he or she had no made proposals for this answer.

Figure 22:
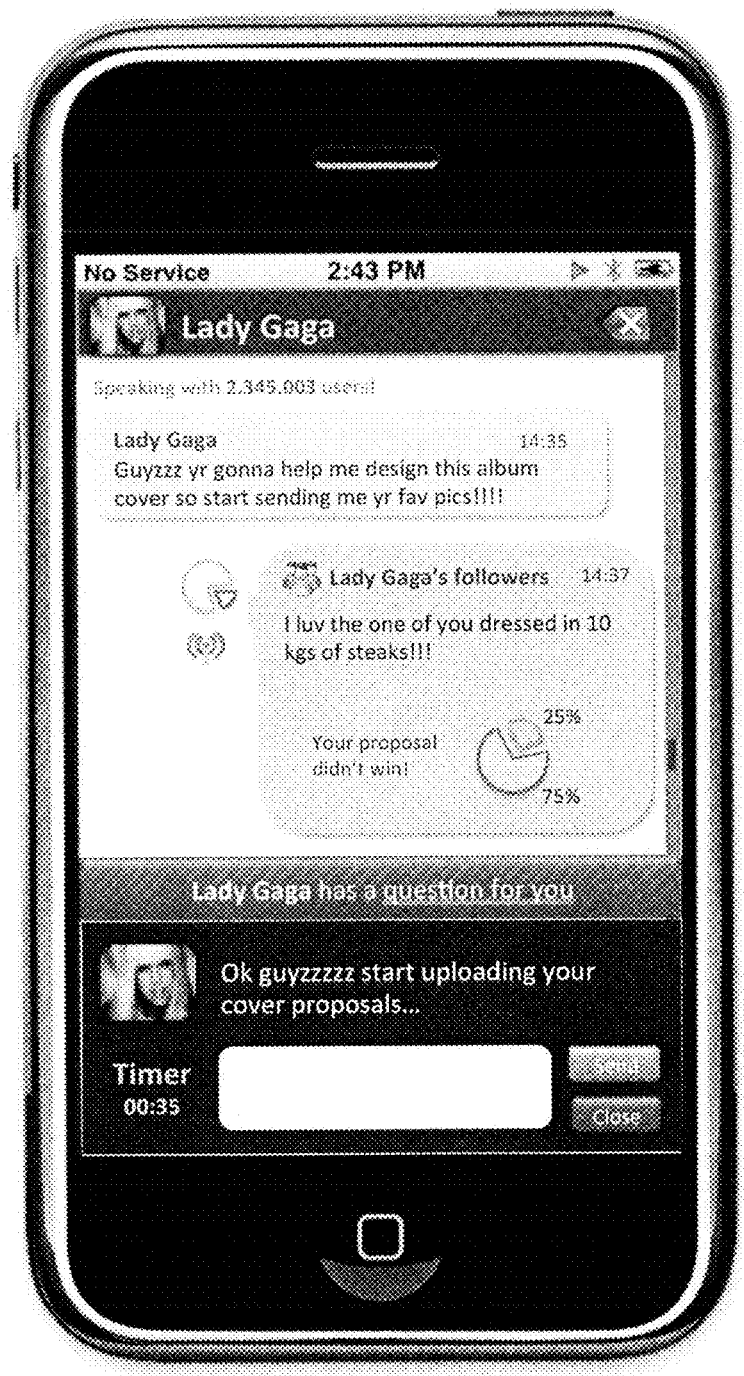

FIG. 22 may show a new and different communication from a leader, e.g., (Lady Gaga). The Chat application shows a different type of question. The screens shown in previous figures represent just a chat with no too much important issue to treat. However, this is a special occasion in which Lady Gaga wants something special from her fans: She asks her fans to start uploading pictures for the cover. Accordingly, the application uses a different treatment for this kind of questions or demands. The message appears in a different part of the screen and there is a dedicated area for sending proposals. There is a timer indicating the time remaining for sending them.

Figure 23:

FIG. 23 shows a screen in which a picture is proposed to the user to be voted. Some other fan has proposed this picture for the album cover and systems and methods herein (e.g., Demorank) may select random samples among the fans connected at the moment, to vote this picture. In the present screen, the user is a member of a random sample so; he or she is asked to vote this picture.

Figure 24:

FIG. 24 shows a screen showing the winner picture, and the percentage of votes achieved by it. It also shows informs the user that his or her proposed picture didn't win and that his or her picture had a voting rate of 30%. It also offers the user the possibility of publishing those results in social networks like Facebook or Twitter. This screen shows a particular case in which the user has made a picture proposal. That's not always the case. A user can be asked to vote as a member of a random sample although he or she had no made proposals for this picture. In alternate embodiments, users may vote on other types of proposals which may or may not be pictures.

Figure 25:

FIG. 25 shows a screen with a new communication from a leader (e.g., Lady Gaga) saying thanks to her fans.

Figure 26:

FIG. 26 shows a screen with a new communication from the leader (e.g., Lady Gaga). This time she is proposing the fan's community to disclose the votes the winner picture got from men and the votes the winner picture got from women.

Figure 27:
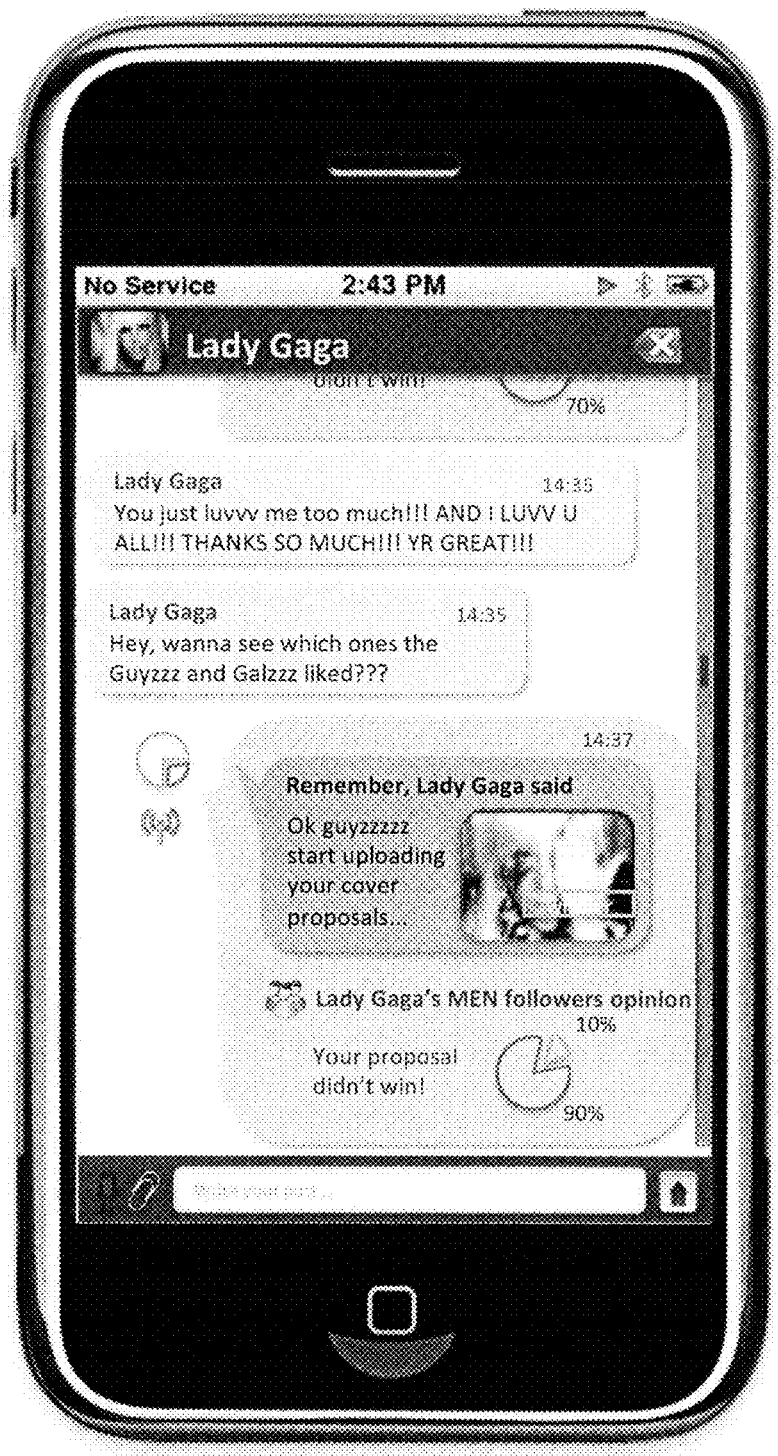
Figure 28:
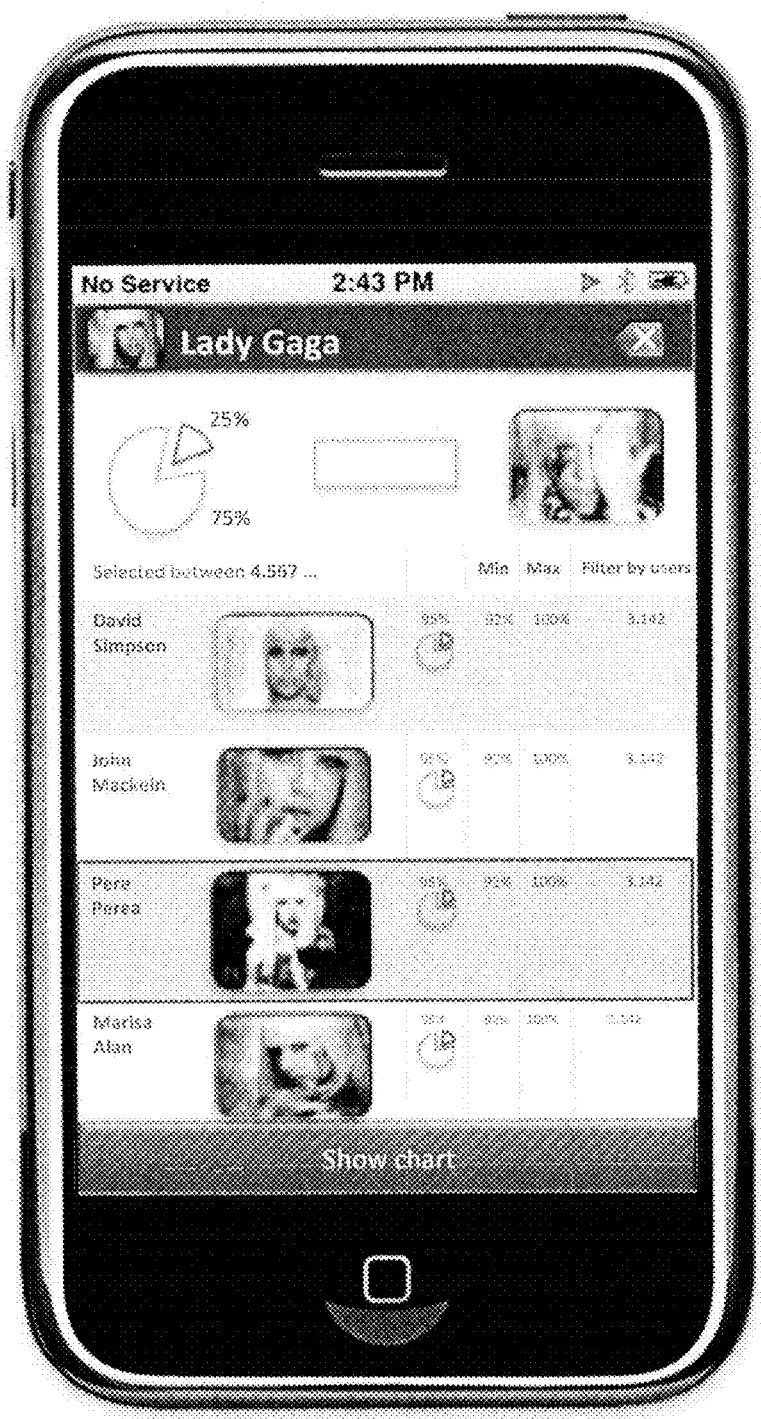

FIG. 27 shows a screen with the percentage of votes obtained by the winner picture from the men community. It also informs the user (who in this case had made a proposal) that her proposal didn't win and got a 10% of acceptance in the men community. The chat offers the user the possibility of publishing those results in her favorite social network like Facebook or Twitter. A similar screen shows the women votes for the winner picture FIG. 28 shows a screen with a ranking of the best-voted pictures and the fans that proposed them, the number of votes and percentage. It is possible to see a chart by clicking the button.

Figure 29:

FIG. 29 shows a three-band chat. Given that the leader (e.g., Lady Gaga) offered the possibility of splitting the community (e.g., between men and women), the chat application uses the profile information of the users to create two fan's communities. By using the same algorithms as provided in the systems and methods herein, both communities can express as a single person the same way the whole fan's community was doing before. Now, both communities and Lady Gaga start a three-band chat.

Figure 30:
Figure 31:
Figure 32:
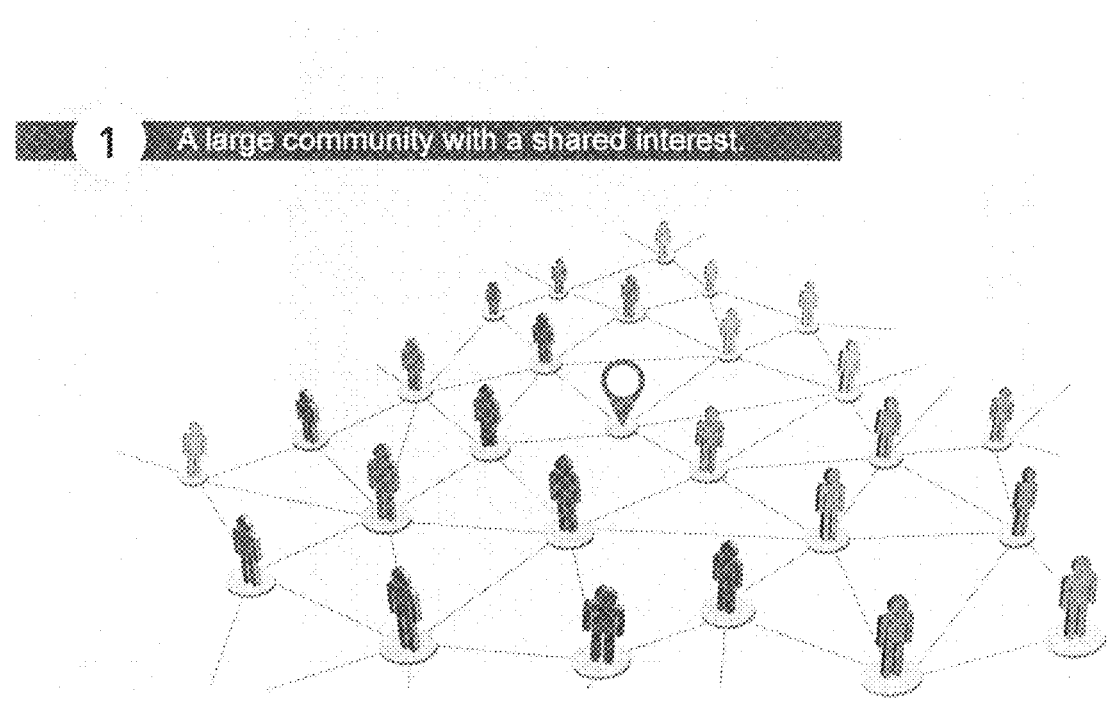
FIGS. 32 to 35 show an example of the basic functioning of the present invention.
Figure 33:
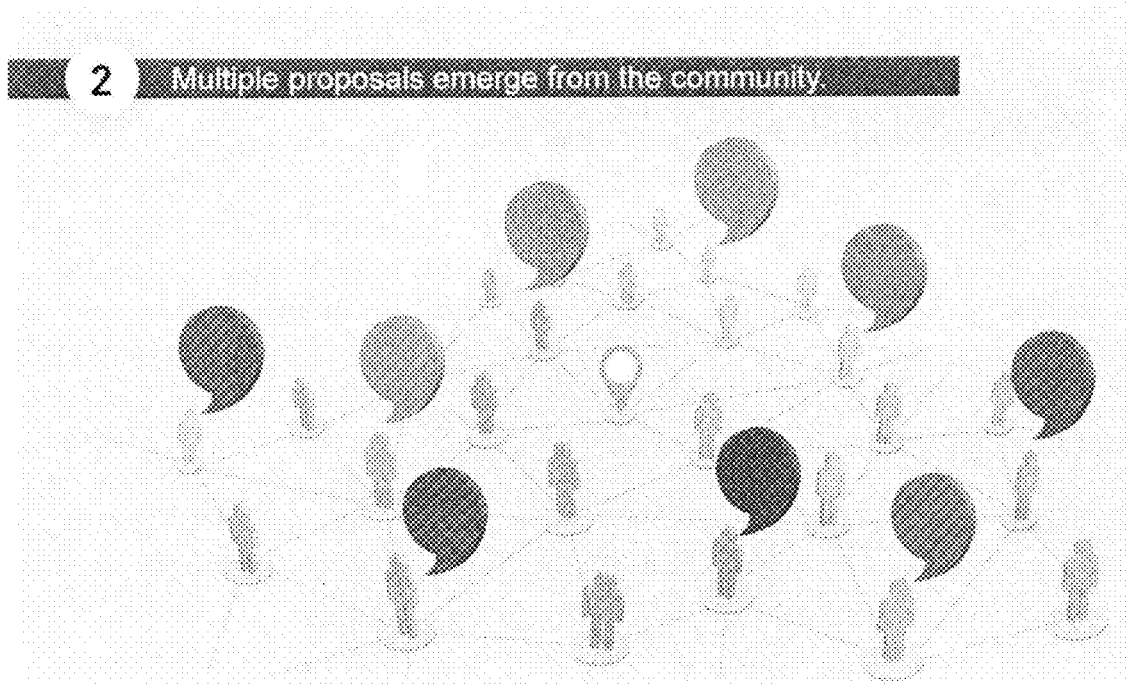
Figure 34:
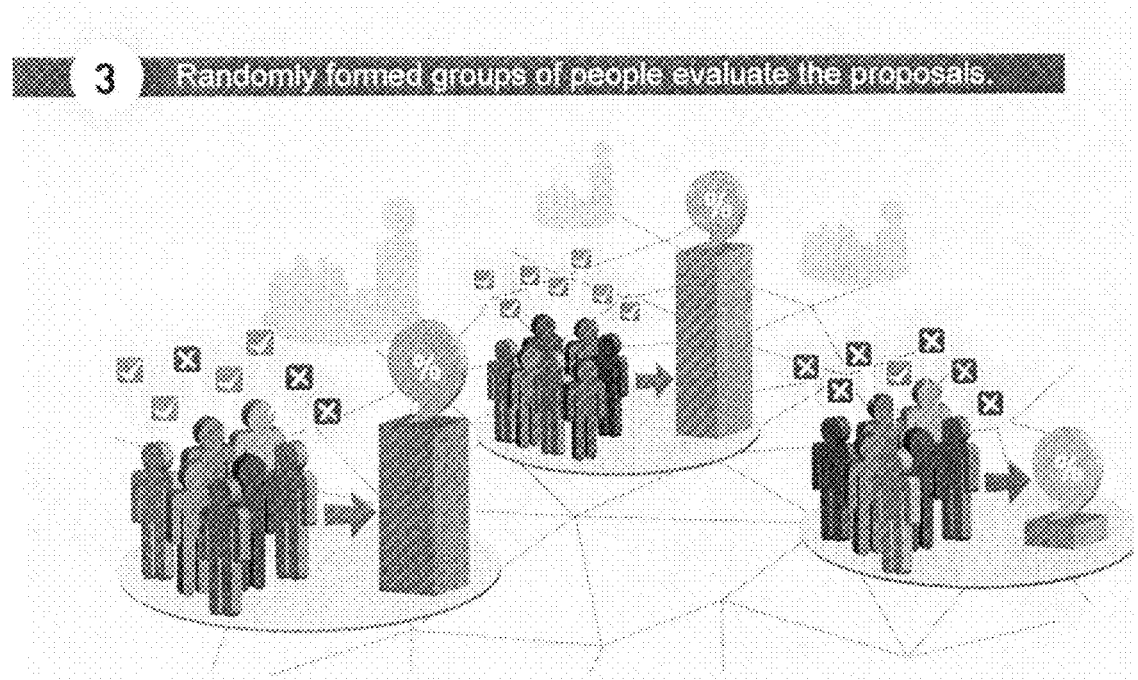
Figure 35:
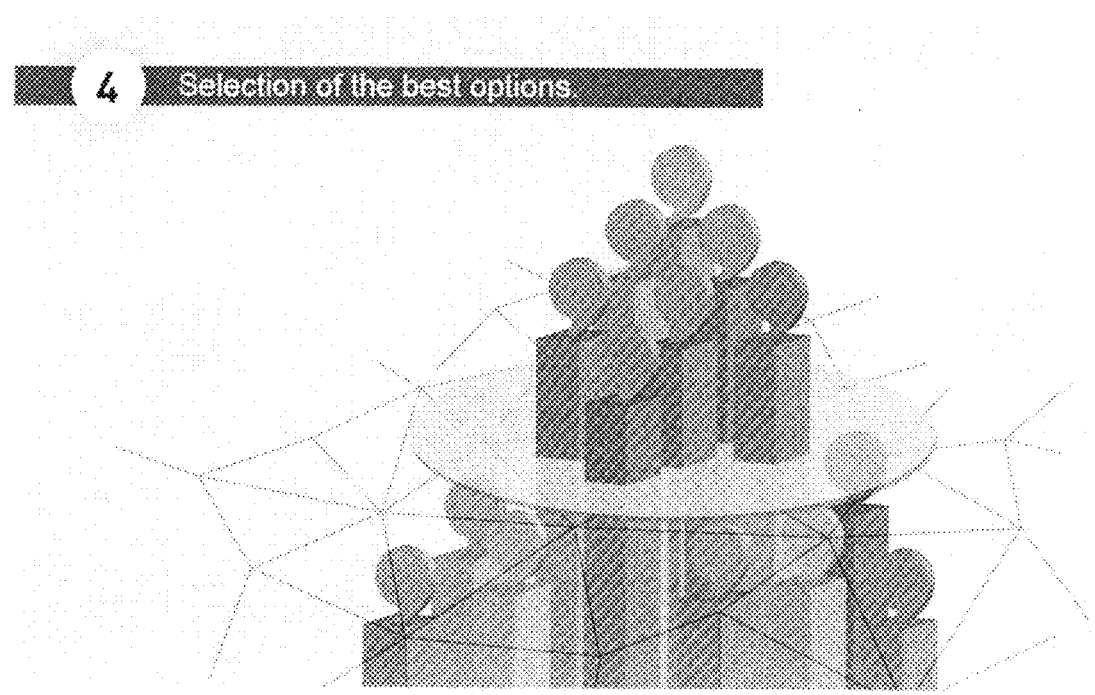

FIG. 30 shows the continuation of the three-band chat.

Assisted Videoconference and Broadcast

In another embodiment, the functionality provided in the systems and methods herein (e.g., Demorank) can be used to connect a panel with a big audience. In this case we combine the various embodiments of the systems and methods herein with one of the existing systems of videoconference that permit to broadcast to the entire Internet a live discussion between several participants. One example of these existing systems might be Google Hangouts Air.

A group of, for example eight people, might participate in a debate using a videoconference system (e.g., Google Hangouts or other existing technology). Given that this technology permits to broadcast the video and audio of the debate in real time to the entire Internet, the systems and methods herein (e.g., Demorank) can be used at the same time allowing the connection of an audience of no limit of people and permit the audience to participate in the debate asking questions, answering questions, proposing, voting and in general expressing the position of the whole audience respect to any topic as a single entity. The audience too might vote on the personality who should be in the panel at any time, or proposing persons from the audience to join the panel.

Shareholders' Meeting

A particular exemplary case of the assisted videoconference and broadcast is the case of a shareholders' meeting:

The shareholders' meeting can be run though a similar system integrating any technology as above described (e.g. Google Hangouts Air) but, in this case, we can adjust the systems and methods (e.g., Demorank) to take into consideration the % of shares of every participant. That way, we can weight the vote of every participant according to his or her number of shares.

This can be a very powerful tool to a more frequent, flexible and efficient mode of shareholders' meeting.

Group Emotions Expression

A particular use of the invention can be the estimation of the emotions of a group. An application using all or part of the features of the invention might receive proposals of expression of emotional states (e.g. using emoticons) and get a statistical estimation of the emotional state of the group. This can be used as a complement of opinion group evaluation for example.

Stratification

When subpopulations within an overall population vary, it might be advantageous to sample each subpopulation (stratum) independently. The agent population can be divided into homogeneous subgroups before sampling. The strata may be mutually exclusive: every element in the agent population may be assigned to only one stratum. The strata may also be collectively exhaustive: no population element can be excluded. Then simple random sampling or systematic sampling is applied within each stratum. This often improves the representativeness of the sample by reducing sampling error. It can produce a weighted mean that has less variability than the arithmetic mean of a simple random sample of the population.

Post-Stratification Weighting

When the population whose opinion that is desired to be known (the group whose reaction is desired to be known) doesn't match exactly to the population that is available (connected for example). Example when we want to know data from the US population and we only have connected a subset of this population, we can use post-stratification weighting over the data obtained from any sample.

It is also possible to use stratification to estimate the interest of subsets of the population among the population members.

Voice and Video

Applications using all or part of the features described herein may use voice and video in many different ways. Just to mention some examples: (1) Parallel video, audio or combined video-audio channel to broadcast communications to the population; (2) Audio, video or combined audio-video back channel presenting for voting small audio, video or combined audio-video pieces to be voted; (3) Combining voice recognition technology with all or part of the invention features to vote; (4) Using voice recognition technology to convert voice to text; and/or (5) Using voice aggregation to express different levels of "conviction" in the community answers depending on the level of consensus.

Computing Scale Out

The group reaction evaluation systems and methods can also be used to avoid overload in massive processes. Random subsets of users can be distributed over different servers, wherein each server may have the same behavior as the total population. The servers may be capable of storing information and/or operating in parallel. In some instances, a cloud computing infrastructure may be utilized.

The systems and methods described herein may utilize one or more component, characteristic, feature, or step described in U.S. Provisional Appln. Ser. No. 61/544,749, U.S. Provisional Appln. Ser. No. 61/591,112, U.S. Patent Publication No. 2011/0231779, U.S. Pat. No. 7,377,431, and PCT Publication No. WO 2003/083615, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of determining reactions on a total set of options in a community comprising a plurality of agents corresponding to user terminals, the method comprising:
   automatically defining a number of groups of options based on a number of options in the total set of options or an expected number of options based on receiving, from the user terminals, agent responses to a broadcast message;
   randomly assigning each agent of the plurality of agents to one of the groups of options;
   transmitting an evaluation message, to each agent, for evaluation on a display, the evaluation message including a number of options from the group of options assigned to the agent that is no more than half of the number of options in the total set of options, the options transmitted for evaluation to each agent assigned to one group of options being different from the options transmitted for evaluation to agents assigned to remaining groups of options;
   receiving, by at least one microprocessor from each of a plurality of responding agents, an evaluation of the options transmitted to the agent;
   determining, by the at least one microprocessor, a best option or a best set of options according to community reaction using the received evaluations; and
   automatically transmitting, by the at least one microprocessor, the best option or the best set of options to a terminal that is a first sender or source of the broadcast message so that the best option or the best set of options is displayed, wherein the number of groups of options is defined as at least two.

2. The method according to claim 1, wherein the agents are assigned to their respective groups using a statistical sampling method.

3. The method according to claim 1, wherein the number of options presented to each of the groups is the same.

4. The method according to claim 1, wherein the number of options presented to each of the groups is determined by equally dividing the number of options in the total set of options by the number of groups.

5. The method according to claim 1, wherein the number of options presented to each of the groups is one.

6. The method according to claim 1, wherein a number of the agents assigned to each of the groups is determined by equally dividing the number of the plurality of agents by the number of options in the total set of options.

7. The method according to claim 1, wherein for each of the groups, the options presented to each agent of the group are different from the options presented to agents in remaining groups.

8. The method according to claim 1, further comprising:
   (a) determining a set of best option candidates using the evaluations received from each of a plurality of responding agents in each of the groups;
   (b) presenting for evaluation, to each responding agent within each of the groups, at least one option from the set of best option candidates; and
   (c) receiving, from each of the plurality of responding agents in each of the groups, an evaluation of the at least one option from the set of best option candidates presented to the agent.

9. The method according to claim 8, further comprising: repeating, a predefined number of times or until a desired statistical confidence level is achieved, the steps of (a)-(c), wherein the agents are assigned to their respective groups using a statistical sampling method, and for each repetition, a number of options in the set of best option candidates is further reduced.

10. The method according to claim 8, wherein the step of (a) determining the set of best option candidates comprises selecting n options having n most favorable evaluations among the total set of options, where n>1 and n is less than the number of options in the total set of options.

11. The method according to claim 1, wherein determining the best option or set of options comprises selecting an option or set of options that received the most favorable evaluations among the total set of options based on the evaluation from each of the plurality of responding agents in each of the groups.

12. The method according to claim 1, wherein the total set of options comprises submissions received from at least one of the plurality of agents.

13. The method according to claim 1, wherein aggregate information regarding the evaluations is made available to the plurality of agents.

14. The method according to claim 1, wherein the reactions on the total set of options are opinions on the total set of options.

15. A non-transitory computer readable medium storing a program that, when executed by a computer, causes the computer to execute a process for determining reactions on a total set of options in a community comprising a plurality of agents corresponding to user terminals, the process comprising:
   automatically defining a number of groups of options based on a number of options in the total set of options or an expected number of options based on receiving, from the user terminals, agent responses to a broadcast message;
   randomly assigning each agent of the plurality of agents to one of the groups of options;
   transmitting, to each agent, an evaluation message for evaluation on a display, the evaluation message including a number of options from the group of options assigned to the agent that is no more than half of the number of options in the total set of options, the options transmitted for evaluation to each agent assigned to one group of options being different from the options transmitted for evaluation to agents assigned to remaining groups of options;
   receiving, from each of a plurality of responding agents, an evaluation of the options presented to the agent; and
   determining a best option or a best set of options according to community reaction using the received evaluations; and
   automatically transmitting the best option or the best set of options to a terminal that is a first sender or source of the broadcast message so that the best option or the best set of options is displayed, wherein the number of groups of options is defined as at least two.

16. A computer system that determines reactions on a total set of options in a community comprising a plurality of agents corresponding to user terminals, the computer system comprising:
   a plurality of user terminals; and
   a programmable microprocessor configured to:
      automatically define a number of groups of options based on a number of options in the total set of options or an expected number of options based on receiving, from the user terminals, agent responses to a broadcast message;

randomly assign each agent of the plurality of agents to one of the groups of options;

transmitting, to each agent, an evaluation message for evaluation on a display of the user terminals, the evaluation message including a number of options from the group of options assigned to the agent that is no more than half of the number of options in the total set of options, the options transmitted for evaluation to each agent assigned to one group of options being different from the options transmitted for evaluation to agents assigned to remaining groups of options;

receive, from each of a plurality of responding agents in each of the groups, an evaluation of the options transmitted to the agent;

determine a best option or a best set of options according to community reaction using the evaluations received from each of the plurality of responding agents in each of the groups; and automatically transmit, the best option or the best set of options to a terminal that is a first sender or source of the broadcast message so that the best option or the best set of options is displayed, wherein the number of groups of options is defined as at least two.

17. A method of providing an estimated community reaction to a broadcast message, the method comprising:

based on receiving a broadcast message from a terminal of a broadcaster, automatically transmitting, by a server, the broadcast message to user terminals corresponding to users of one or more groups of users;

displaying, by at least a subset of the user terminals, the broadcast message in a graphical user interface;

transmitting, by the subset of the user terminals, to the server, proposed responses to the broadcast message;

based on receiving, by the server, a predetermined number of proposed responses from at least the subset of the user terminals:
  (i) automatically creating, by the server, an option set comprising a plurality of options, wherein a number of the plurality of options corresponds to a total number of the proposed responses or an expected total number of the proposed responses;
  (ii) automatically randomly assigning, by the server, each of the users from among the one or more groups of the users to one of a plurality of groups of the options, each of the groups of the options including a combination of the options that is different from each combination of the other groups of the options and each of the groups of the options including a number of options that is fewer than a total number of the options;
  (iii) automatically transmitting, by the server, to the user terminals associated with each of the users from among the one or more groups of users, the combination of options corresponding to the respectively assigned one group of the options so that the user terminals associated with each of the users from among the one or more groups of users displays the combination of the options corresponding to the assigned one group of the options; and based on receiving, by the server, selections of the options:
  (i) automatically determining, by the server, a best option or best set of options; and
  (ii) automatically transmitting, by the server to the terminal of the broadcaster, the best option or the best set of the options in real time so that the terminal of the broadcaster displays, in real time, the best option or the best set of the options, thereby providing the estimated community reaction to the broadcast message to the broadcaster, wherein the server comprises a processor and the number of the groups of the options is two or more.

\* \* \* \* \*